(12) United States Patent
Xu et al.

(10) Patent No.: US 10,708,861 B2
(45) Date of Patent: Jul. 7, 2020

(54) ELECTRONIC DEVICE AND METHOD USED FOR NETWORK CONTROL TERMINAL AND NETWORK NODE

(71) Applicant: Sony Corporation, Tokyo (JP)

(72) Inventors: Xiaodong Xu, Beijing (CN); Yunqiu Xiao, Beijing (CN); Xin Guo, Beijing (CN); Shiqing Zhang, Beijing (CN); Yi Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 5 days.

(21) Appl. No.: 16/313,903

(22) PCT Filed: Jul. 21, 2017

(86) PCT No.: PCT/CN2017/093806
§ 371 (c)(1),
(2) Date: Dec. 28, 2018

(87) PCT Pub. No.: WO2018/028416
PCT Pub. Date: Feb. 15, 2018

(65) Prior Publication Data
US 2019/0174411 A1 Jun. 6, 2019

(30) Foreign Application Priority Data

Aug. 11, 2016 (CN) .......................... 2016 1 0657623

(51) Int. Cl.
*H04W 88/04* (2009.01)
*H04W 76/14* (2018.01)
(Continued)

(52) U.S. Cl.
CPC ....... *H04W 52/0216* (2013.01); *H04W 52/02* (2013.01); *H04W 72/0406* (2013.01);
(Continued)

(58) Field of Classification Search
CPC . H04W 52/0216; H04W 72/12; H04W 52/02; H04W 72/0406; H04W 88/04; H04W 76/14; H02W 76/28; Y02D 70/20
See application file for complete search history.

(56) References Cited

U.S. PATENT DOCUMENTS

2016/0212708 A1* 7/2016 Kim ................... H04W 52/0229
2016/0381666 A1 12/2016 Kim et al.
(Continued)

FOREIGN PATENT DOCUMENTS

CN 101841920 A 9/2010
CN 102378329 A 3/2012
(Continued)

OTHER PUBLICATIONS

3GPP TS 36.321 V12.5.0 (Mar. 2015), 3rd Generation Partnership Project; Technical Specification Group Radio Access Network; Evolved Universal Terrestrial Radio Access (E-UTRA); Medium Access Control (MAC) protocol specification (Year: 2015).*
(Continued)

*Primary Examiner* — Un C Cho
*Assistant Examiner* — Peter K Mak
(74) *Attorney, Agent, or Firm* — Xsensus LLP

(57) ABSTRACT

Provided in the present disclosure is an electronic device used for a network control terminal and a method used for the electronic device, and an electronic device used for a network node and a method used for the electronic device. The electronic device used for the network control terminal comprises: a processing circuit, configured to configure, for a relay link between the network node and one or more other network nodes, a SL-DRX for the network node and/or the one or mote other network nodes and perform relay trans-
(Continued)

mission between the network node and the one or more other network nodes on the basis of the configuration of the SL-DRX.

18 Claims, 17 Drawing Sheets

(51) Int. Cl.
*H04W 52/02* (2009.01)
*H04W 72/12* (2009.01)
*H04W 76/28* (2018.01)
*H04W 72/04* (2009.01)

(52) U.S. Cl.
CPC ........... *H04W 72/12* (2013.01); *H04W 76/28* (2018.02); *H04W 88/04* (2013.01); *Y02D 70/00* (2018.01); *Y02D 70/20* (2018.01)

(56) References Cited

U.S. PATENT DOCUMENTS

| | | | |
|---|---|---|---|
| 2017/0230941 A1* | 8/2017 | Agiwal | H04W 72/04 |
| 2017/0295601 A1 | 10/2017 | Kim et al. | |
| 2018/0048986 A1* | 2/2018 | Adachi | H04W 4/70 |
| 2018/0176892 A1 | 6/2018 | Kim et al. | |
| 2019/0053305 A1* | 2/2019 | Saiwai | H04L 5/0094 |
| 2019/0313475 A1* | 10/2019 | Siomina | H04W 24/10 |

FOREIGN PATENT DOCUMENTS

| | | |
|---|---|---|
| WO | 2013/131234 A1 | 9/2013 |
| WO | 2015/142066 A1 | 9/2015 |
| WO | 2015/152581 A1 | 10/2015 |
| WO | 2016/028126 A1 | 2/2016 |
| WO | 2016/076781 A1 | 5/2016 |

OTHER PUBLICATIONS

IEEE Communications Standards Magazine, Applying Device-to-Device Communication to Enhance IoT Services (Year: 2017).*

English language translation of International Search Report and Written Opinion of International Application No. PCT/CN2017/093806, dated Oct. 9, 2017.

"3rd Generation Partnership Project; Technical Specification Group Radio Access Network; Evolved Universal Terrestrial Radio Access (E-UTRA); Medium Access Control (MAC) protocol specification (Release 13)", 3GPP Standard; vol. RAN WG2, No. V13.2.0, Jul. 7, 2016 (Jul. 7, 2016), pp. 1-91, XP051123446.

Extended European Search Report dated Jun. 3, 2019 in European Application No. 17838546.4-1219.

* cited by examiner

ELECTRONIC DEVICE AND METHOD USED FOR NETWORK CONTROL TERMINAL AND NETWORK NODE

CROSS-REFERENCE TO RELATED APPLICATIONS

The present application is a National Stage Application based on PCT/CN2017/093806, filed on 21 Jul. 2017, and claims priority to Chinese Patent Application No. 201610657623.5, titled "ELECTRONIC DEVICE AND METHOD USED FOR NETWORK CONTROL TERMINAL AND NETWORK NODE", filed on Aug. 11, 2016 with China National Intellectual Property Administration, which is incorporated herein by reference in its entirety.

FIELD OF THE INVENTION

Embodiments of the present disclosure generally relate to the field of wireless communications, in particular to relay wireless communications, and more particularly to an electronic apparatus for a network control terminal and a method for the electronic apparatus, an electronic apparatus for a network node and a method for the electronic apparatus.

BACKGROUND OF THE INVENTION

In recent years, using LTE technology to implement MTC (Machine Type Communication) device connection and communication has attracted industry attention. In many scenarios, these low energy consumption devices are wearable devices and are less distant from the smartphone around people. At this time, using the smartphone as a relay device of the wearable device, that is, using the UE-to-Network communication mode can reduce the energy consumption of the wearable device.

Two relay scenarios are mainly studied in Release 14, as shown in FIGS. 1 and 2, where Uu represents a communication link between an evolved Node B (eNB) and relay user equipment (UE), PC5 represents a communication link between the relay UE and a remote UE, UL represents an uplink, and DL represents a downlink. FIG. 1 illustrates a two-way relay scenario in which the remote UE transmits uplink and downlink data through the relay UE, that is, the remote UE does not directly communicate with the eNB, and both uplink and downlink transmissions are completed by the relay UE. FIG. 2 illustrates a one-way relay scenario in which the remote UE only transmits uplink data through the relay UE, and downlink data is still directly received from the eNB through the Uu link.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present application, an electronic apparatus for a network control terminal is provided which includes processing circuitry configured to: with respect to a sidelink between a relay network node and a remote network node, configure discontinuous reception SL-DRX for the relay network node and/or the remote network node; and generate a control signaling including configuration, of the SL-DRX, to indicate to the relay network node and/or the remote network node.

According to another aspect of the present application, an electronic apparatus for a network node is provided which includes processing circuitry configured to: with respect to a sidelink between the network node and one or more other network nodes, configure discontinuous reception SL-DRX for the network node and/or the one or more other network nodes: and perform, based on configuration of the SL-DRX, relay transmission between the network node and the one or more other network nodes.

According to as aspect of the present application, a method for an electronic apparatus for a network control terminal is provided which includes: with respect to a sidelink between a relay network node and a remote network node, configuring discontinuous reception SL-DRX for the relay network node and/or the remote network node: and generating a control signaling including configuration of the SL-DRX, to indicate to the relay network node and/or the remote network node.

According to another aspect of the present application, a method for an electronic apparatus for a network node is provided which includes: with respect to a sidelink between the network node and one or more other network nodes, configuring discontinuous reception SL-DRX for the network node and/or the one or more other network nodes: and performing, based on configuration of the SL-DRX, relay transmission between the network node and the one or more other network nodes.

According to other aspects of the present disclosure, there are further provided computer program codes and computer program products for methods for the electronic device as well as a computer-readable storage medium recording the computer program codes for implementing the methods.

The electronic apparatus and method according to the embodiments of the present application can reduce the energy consumption of a network node that performs relay communication by using discontinuous reception (DRX) on the sidelink.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, axe incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

As described above, the smartphone can act as a relay device for the wearable device to reduce the energy consumption of the wearable device. Since a transmission data stream is usually a burst, that is, there is data transmission only within a certain period of time, the device serving as a receiving terminal can stop detecting when there is no data transmission, thereby achieving power saving, which is referred to as discontinuous reception (DRX). Especially when the wearable device has a lower data amount demand for transmission and reception, the application of DRX is more significant for reducing the device energy consumption and reducing the commercial cost. In the present application, DRX is for a sidelink, and thus it is referred to as Sidelink-DRX (SL-DRX) to be distinguished from DRX in LTE (the UE performs discontinuous reception of data from an eNB).

Figure 3:
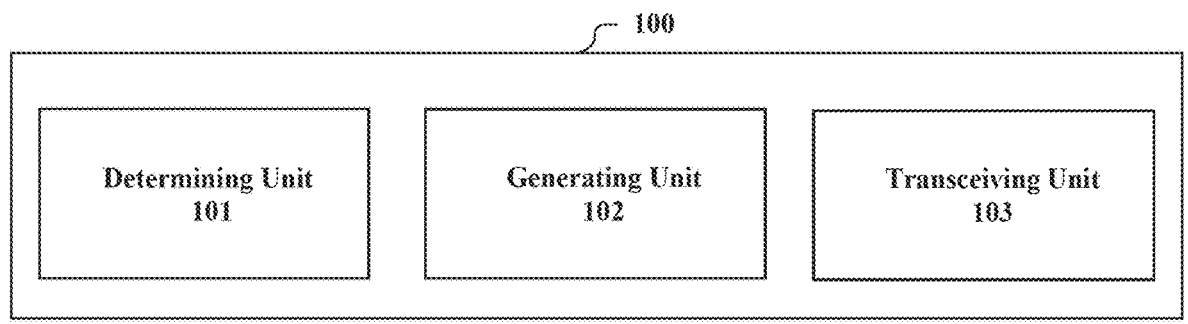
FIG. 3 is a functional module block diagram showing an electronic apparatus for a network control terminal according to an embodiment of the present application.

FIG. 3 shows a functional module block diagram of an electronic apparatus 100 for a network control terminal according to an embodiment of the present application, and the electronic apparatus 100 includes: a determining unit 101, configured to, with respect to a sidelink between a relay network node and a remote network node, configure discontinuous reception SL-DRX for the relay network node and/or the remote network node; and a generating unit 102, configured to generate a control signaling including configuration of the SL-DRX, to indicate to the relay network node and/or the remote network node.

The determining unit 101 and the generating unit 102 may be implemented, for example, by one or more processing circuits, and the processing circuits may be implemented, for example, as a chip.

The network control terminal refers to an entity in a communication system for implementing functions such as relevant setting, control, and communication resource allocation related of communication activities, such as a base station in a cellular communication system, a baseband cloud device under a C-RAN (Cloud-RAN/Centralized-RAN) architecture (there may be no concept of a cell), such as any BBU in the BBU pool that is in high speed communication with each other under the C-RAN architecture, or the like. A network node refers to an entity in a communication system that uses communication resources to achieve its communication purposes, such as various user equipment (such as a mobile terminal, a smart vehicle, a smart wearable device or the like which has a cellular communication capability) or a network infrastructure such as a small cell base station.

Figure 1:
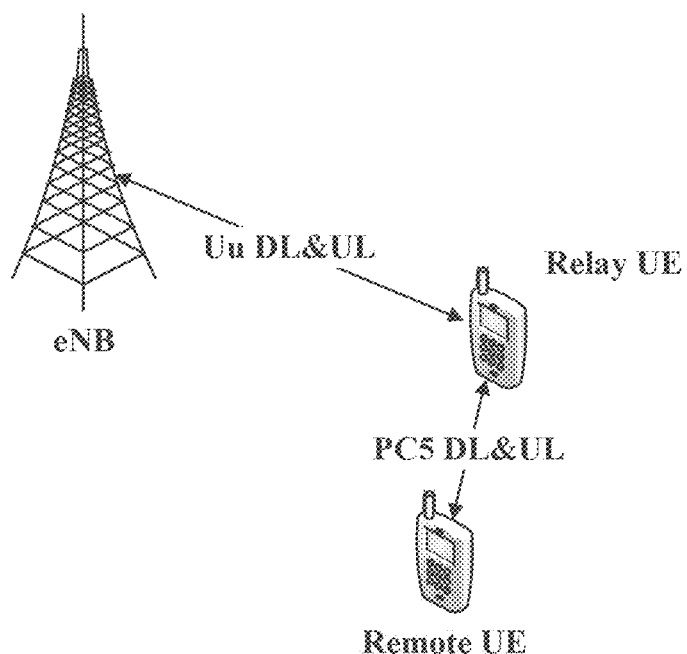
FIG. 1 is a schematic diagram showing a two-way relay scenario.
Figure 2:
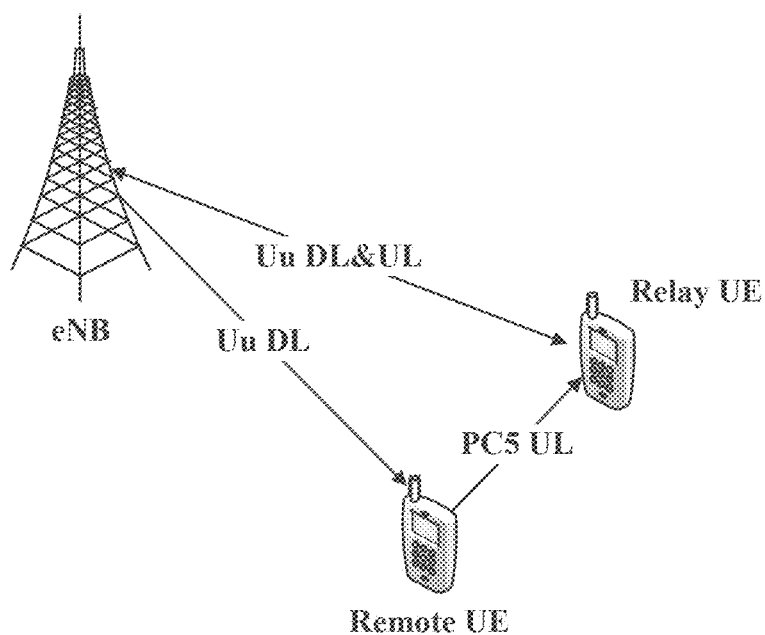
FIG. 2 is a schematic diagram showing a one-way relay scenario.

The technical solution of the present application can be applied to various relay scenarios, including but not limited to those relay scenarios shown in FIG. 1 and FIG. 2, where the eNB in FIG. 1 and FIG. 2 is an example of the network control terminal, and the relay UE and the remote UE are examples of the relay network node and the remote network node, respectively. In addition, with respect to the position of a remote network node, there may also be different settings. For example, the remote network node may be located within the coverage range of a network control terminal, or may be located outside the coverage range.

In the case that a sidelink is established between the relay network node and the remote network node, when the two perform relay communication, a PSCCH (physical sidelink control channel) will be transmitted to the counterpart, or a PSCCH will be received from the counterpart. However, if the relay network node and the remote network node always detect the PSCCH on the sidelink, it will consume too much power. Therefore, in the present embodiment, with respect to the sidelink, a DRX is configured for the relay network node and the remote network node, which is called SL-DRX. Thus, the purpose of power saving is achieved by intermittently stopping detection of the PSCCH. For example, the determining unit 101 may determine an active time for the relay network node and/or the remote network node to detect the PSCCH and a sleep time for the relay network node and/or the remote network node not to detect the PSCCH.

It should be noted that, SL-DRX is independent of the traditional DRX, that is, intermittently stopping receiving a PDCCH (physical downlink control channel) on a downlink between the network node and the network control terminal.

In this embodiment, the configuration of SL-DRX is performed by the electronic apparatus 100 of the network control terminal. For example, the electronic apparatus 100, and in particular the determining unit 101, can configure the SL-DRX for both the relay network node and the remote network node. Alternatively, the electronic apparatus 100 may only configure the SL-DRX for the relay network node, while the relay network node configures the SL-DRX for the remote network node. Moreover, in a certain embodiment, the electronic apparatus 100 may also configure only the SL-DRX for the remote network node.

In an example, the configuration of SL-DRX may include timers as follows: a SLDRX-onDurationTimer for indicating the number of continuous PSCCH sub-frames for the network node to detect the PSCCH after the network node wakes up from the sleep state; a SLDRX-InactivityTimer for indicating the maximum number of PSCCH sub-frames for the network node to wait for successfully decoding of the PSCCH: a SLDRX-Cycle for indicating the number of sub-frames included in one SL-DRX cycle; and a SLDRX-StartOffset for indicating a sub-frame position where each SL-DRX cycle starts.

Figure 4:
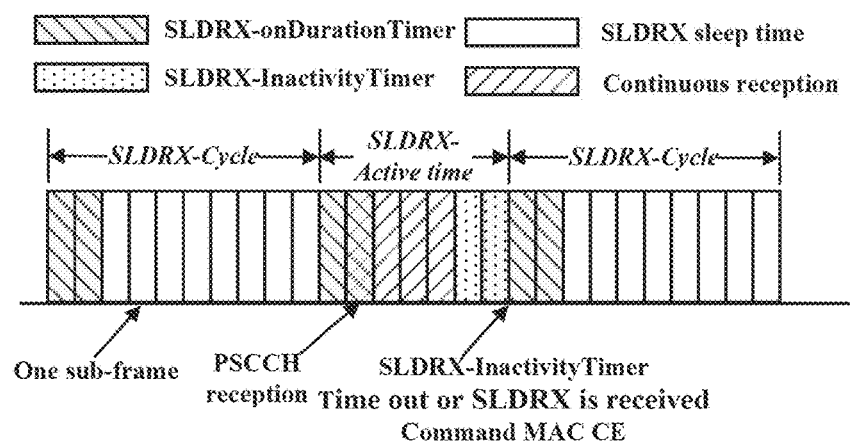
FIG. 4 is a diagram showing an example of a relationship between respective timers of configuration of SL-DRX.

FIG. 4 shows a diagram of an example of a relationship between the above respective timers. Where the gray-filled block corresponds to the SLDRX-onDurationTimer. After the network node wakes up from the sleep state, it detects the PSCCH within the continuous PSCCH sub-frames represented by the gray part. If no PSCCH is successfully decoded until the SLDRX-onDurationTimer times out (two sub-frames in the example of FIG. 4), the network node turns to the sleep state.

Conversely, if one PSCCH is successfully decoded, the network node keeps the detection state, and at the same time, starts the timer SLDRX-InactivityTimer to start timing. The SLDRX-InactivityTimer is represented by a dot-filled block in the figure, which represents the maximum number of PSCCH sub-frames for the network node to wait for successfully decoding of a PSCCH. Therefore, when the network node successfully decodes an initially transmitted PSCCH, the timer needs to be reset. While in the case where the SLDRX-InactivityTimer tones out, the network node re-enters a SL-DRX cycle, that is, starts the SLDRX-onDurationTimer. The blank block in FIG. 4 represents a sleep time of the SL-DRX. A SLDRX-Cycle is the number of sub-frames included in a SL-DRX cycle, including two parts, the SLDRX-onDurationTimer and the sleep time of the SL-DRX.

FIG. 4 shows the entire time period SLDRX-ActiveTime during which the network node wakes up, which, as can be seen, includes the SLDRX-onDurationTimer and the SLDRX-InactivityTimer as well as the continuous reception time. The diagonal line filled block indicates a continuous reception tune period of the SL-DRX. When it exceeds the SLDRX-InactivityTimer and no PSCCH sub-frame is successfully decoded, the SLDRX-InactivityTimer times out. While in the case where the PSCCH is not detected, the SLDRX-onDurationTimer corresponds to a wake-up active time, and the SLDRX-Cycle minus the SLDRX-onDurationTimer is the sleep time. The network node will cycle at a period of SLDRX-Cycle.

In addition, the judgement as to whether the current sub-frame satisfies SLDRX-StartOffset so that the SLDRX-onDurationTimer can be started is performed according to the following equation (1):

$$[(SFN*10)+\text{the current number of sub-frames}] \\ \text{modulo}(SLDRX\text{-}Cycle)=SLDRX\text{-}StartOffset \quad (1)$$

Where SFN is a system frame number, and a cycle is 1024. One frame contains 10 sub-frames. The SLDRX start sub-frame position is calculated here, so the SFN needs to be multiplied by 10.

Therefore, the SLDRX-StartOffset is used to determine the position of the sub-frame where each SL-DRX cycle starts.

The generating unit 102 generates a control signaling including the above SL-DRX configuration to instruct the corresponding relay network node and/or the remote network node to perform SL-DRX configuration. The control signaling may be, for example, Radio Resource Control (RRC) signaling.

Furthermore, as shown by the dashed line block in FIG. 3, the electronic apparatus 100 may further include: a transceiving unit 103, configured to transmit a control signaling to the relay network node and/or the remote network node. For example, the transceiving unit 103 can transmit via a RRC signaling.

In one example for example in a two-way relay scenario and the determining unit 101 determines the SL-DRX configuration for both the relay network node and the remote network node, the transceiving unit 103 is configured to transmit the control signaling including the SL-DRX configuration of the relay network node and the remote network node to the relay network node, wherein the SL-DRX configuration of the remote network node is forwarded by the relay network node. This forwarding can be implemented by the RRC signaling or a broadcast signaling, for example.

In another example, for example in a one-way relay scenario and the determining unit 101 determines the SL-DRX configuration for both the relay network node and the remote network node, the transceiving unit 103 can be configured to transmit the control signaling including the respective SL-DRX configuration to the relay network node and the remote network node, respectively.

Figure 5:
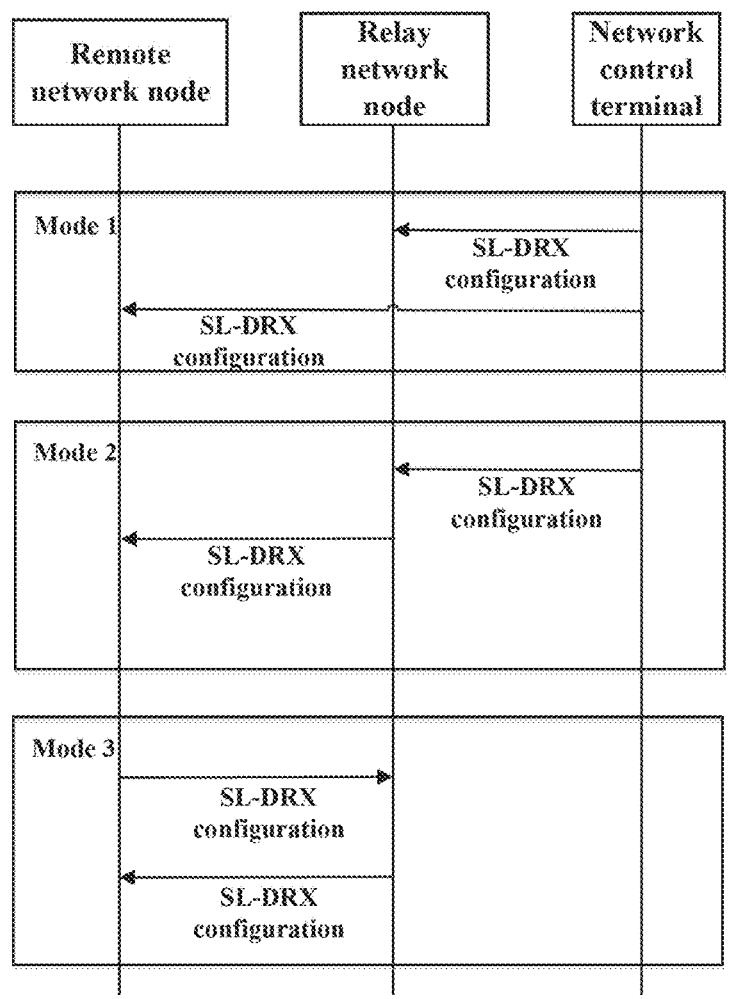
FIG. 5 is a schematic illustration showing a SL-DRX configuration mode.

It should be understood that the SL-DRX configuration mode is not limited thereto. For example, the relay network node may also perform the SL-DRX configuration for the remote network node, or the relay network node and the remote network node may mutually configure the SL-DRX for each other. For ease of understanding, FIG. 5 shows a schematic illustration of a SL-DRX configuration mode, where mode 1 is a mode that the network control terminal transmits the SL-DRX configuration to the relay network node and the remote network node, respectively, and mode 2 is a mode that the relay network node transmits the SL-DRX configuration to the remote network node (the SL-DRX configuration may be received from the network control terminal or determined by the relay network node itself), and mode 3 is a mode that the relay network node and the remote network node mutually configure the SL-DRX for each other. Note that these modes are merely exemplary and are not limited thereto.

The electronic apparatus 100 according to this embodiment can reduce the energy consumption of the relay network node and/or the remote network node by configuring the SL-DRX of the sidelink.

Second Embodiment

Figure 6:
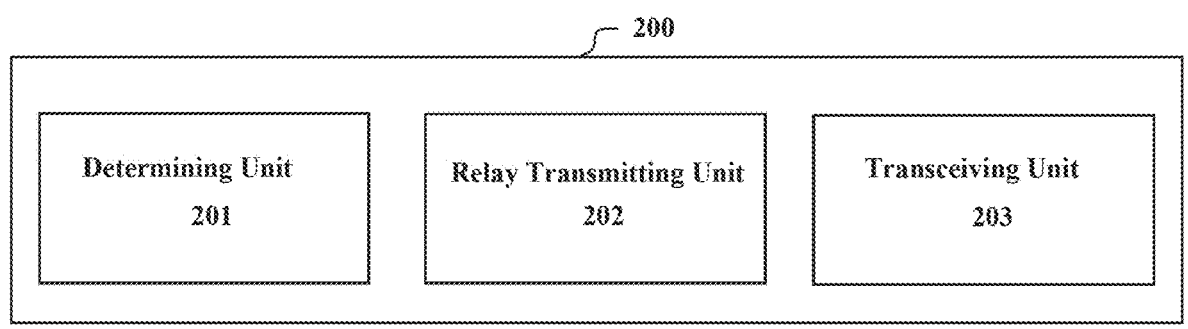
FIG. 6 is a functional module block diagram showing an electronic apparatus for a network node according to an embodiment of the present application.

FIG. 6 shows a structural block diagram of an electronic apparatus 200 for a network node according to an embodiment of the present application, and the electronic apparatus 200 includes: a determining unit 201, configured to, with respect to a sidelink between the network node and one or more other network nodes, configure discontinuous reception SL-DRX for the network node and one or more other network nodes; and performing a relay transmission between the network node and the one or more other network nodes based on the SL-DRX configuration.

The network node in the present embodiment may be a relay network node, or may also be a remote network node. In the case of a relay network node, there may be a case where there is a sidelink between the relay network node and a plurality of remote network nodes, that is, a one-to-many relay.

For example, the determining unit 201 may determine the SL-DRX configuration based on the control signaling from the network control terminal. For example, the determining unit 201 may determine an active time for the network node and/or the one or more other network nodes to detect the PSCCH and a sleep time for the network node and/or the one or more other network nodes not to detect the PSCCH. The configuration of the SL-DRX may include, for example, a SLDRX-onDurationTimer for indicating the number of continuous PSCCH sub-frames for the network node to detect the PSCCH after the network node wakes up from the sleep state; a SLDRX-InactivityTimer for indicating the maximum number of PSCCH sub-frames for the network node to wait for successfully decoding of the PSCCH; a SLDRX-Cycle for indicating the number of sub-frames included in one SL-DRX cycle; and a SLDRX-StartOffset for indicating a sub-frame position where each SL-DRX cycle starts. The configuration regarding the SL-DRX has been described in detail in the first embodiment and will not be repeated herein.

In one example, the network node is a relay network node, and the control signaling from the network control terminal contains the SL-DRX configuration for the network node and the one or more other network nodes (i.e., a remote network node of the network node). In this case, the determining unit 201 can determine the configuration of the SL-DRX for the network node and its remote network node.

Conversely, if the configuration of the SL-DRX of the remote network node is not included in the control signaling, the determining unit 201 determines only the configuration of the SL-DRX of the network node according to the control signaling.

Furthermore, the determining unit 201 may also determine the configuration of the SL-DRX of its remote network node in other ways. For example, the determining unit 201 determines the configuration of the SL-DRX of the one or more other network nodes based on data to be transmitted by the network node. This is because the SL-DRX configuration at the receiving terminal depends on the amount of data to be transmitted by the transmission terminal. Of course, the determining unit 201 may also determine the configuration of the SL-DRX of the remote network node according to other factors, and it is not limited thereto.

In another example, such as in a one-way relay scenario, the network node is a remote network node. In this case, the determining unit 201 can also determine the configuration of the SL-DRX of the relay network node based on data to be transmitted by the network node.

As shown by the dashed line block in FIG. 6, the electronic apparatus 200 may further include: a transceiving unit 203, configured to transmit control signaling including the configuration of the SL-DRX of another network node to the corresponding network node. For example, the relay network node forwards the configuration of the SL-DRX received from the network control terminal to the remote network node, or transmits the configuration of the SL-DRX determined by the relay network node itself (for example, corresponding to mode 2 in FIG. 5) to the remote network node. Alternatively, the remote network node transmits its determined configuration of SL-DRX to the relay network node (e.g., corresponding to mode 3 in FIG. 5).

The transceiving unit 203 can transmit via RRC signaling or broadcast signaling. In a one-to-many relay scenario, the use of broadcast signaling helps to reduce signaling overhead.

In addition, the transceiving unit 203 may be further configured to transmit control information instructing another network node to enter the SL-DRX sleep state to the other network node, or receive the control information from the other network node. For example, when the amount of data to be transmitted by the network node is relatively small or the transmission is about to be completed, the control information may be used to instruct the other network node to enter the SL-DRX sleep state. For example, after receiving the control information, the other network node enters a new SL-DRX Cycle, and enters the sleep state after the SLDRX-onDurationTimer times out. Therefore, in addition to the case described in the first embodiment where the network node enters the sleep state due to the SLDRX-InactivityTimer timing out, this provides another way for the network node to enter the sleep state.

For example, the control information can be represented by a MAC PDU sub-header carrying LCID. Specifically, a command element SLDRX Command MAC CE may be newly added, and the LCID corresponding to the SLDRX Command MAC CE is represented on the SL-SCH as shown in Table 1 below. It can be seen that the SLDRX Command MAC CE has a fixed length of 5 bits.

TABLE 1

| Index | Value of LCID |
| --- | --- |
| 11011 | SL-DRX command |

Therefore, when the network node receives the SLDRX Command MAC CE with the value "11011", it can enter the SL-DRX sleep state, as shown in FIG. 4.

The electronic apparatus 200 according to this embodiment can reduce the energy consumption of the network node by performing SL-DRX of the sidelink.

Third Embodiment

After the SL-DRX is introduced on the sidelink, the length of the SLDRX-ActiveTime where the relay network node receives data varies with the scheduling decision and the success or failure of the decoding, and when the remote network node transmits data to the relay network node, it does not know about the downlink communication states of the relay network node and the network control terminal. Therefore, in some communication schemes such as FDD, it may happen that the relay network node receives data from the network control terminal simultaneously when it is in the SLDRX-ActiveTime. In this way, data conflicts may occur and the relay network node may lose data on one of the links. A similar problem exists for the remote network node capable of receiving data from the network control terminal and data from the relay network node. Therefore, in order to avoid conflicts occurring at the time of data reception and to maintain balance between high energy efficiency and quality of service (QoS), the present embodiment proposes schemes for coordination.

These schemes will be described below with reference to the electronic apparatus 100 in FIG. 3 and the electronic apparatus 200 in FIG. 6.

Scheme 1

In one example, coordination is performed through centralized scheduling by the network control terminal. For example, the determining unit 101 may be configured to allocate resources orthogonal to each other to the following two transmissions to avoid conflict: a general downlink transmission from the network control terminal to the relay network node; and a sidelink transmission from the remote network node to the relay network node. Alternatively, the determining unit 101 may be configured to allocate resources orthogonal to each other to the following two transmissions to avoid conflict: a general downlink transmission from the network control terminal to the remote network node; and a sidelink transmission from the relay network node to the remote network node.

For example, the determining unit 101 may allocate orthogonal wireless resources to the network control terminal and the remote network node for transmitting data to the relay network node. The orthogonal resources are temporally separated, non-overlapping resources, for example. In this way, the data received by the relay network node from the network control terminal and the data received by the relay network node from the remote network node are inherently independent in time domain, and thus the data conflict can be avoided.

Further, in a certain embodiment, when the transmission requests on the sidelink and the general link occur simultaneously, the determining unit 101 may set, according to priority levels of the general link and the sidelink, a transmission order of the general link and the sidelink, and update the SL-DRX configuration of the relay network node or the remote network node according to the transmission order.

For example, a relay network node first receives data on one link with a higher priority level regardless of the state of the other link. In an embodiment, the priority levels of transmission and reception on the general link are both higher than those of transmission or reception on the sidelink. When there are data transmission requests on both the sidelink and the general downlink, the relay network node first receives information from the general link. Then, the determining unit 101 can update the SL-DRX configuration of the relay network node and schedule the remote network node to transmit data to the relay network node later.

A similar process may be performed for a situation where a conflict occurs at a remote network node, and at this time, the determining unit updates the SL-DRX configuration of the remote network node and schedules the relay network node to transmit data to the remote network node later.

On the other hand, when the priority level of transmission or reception on the sidelink is relatively higher, the relay network node will first receive information from the sidelink, and the network control terminal is scheduled to transmit data to the relay network node later.

Figure 7:
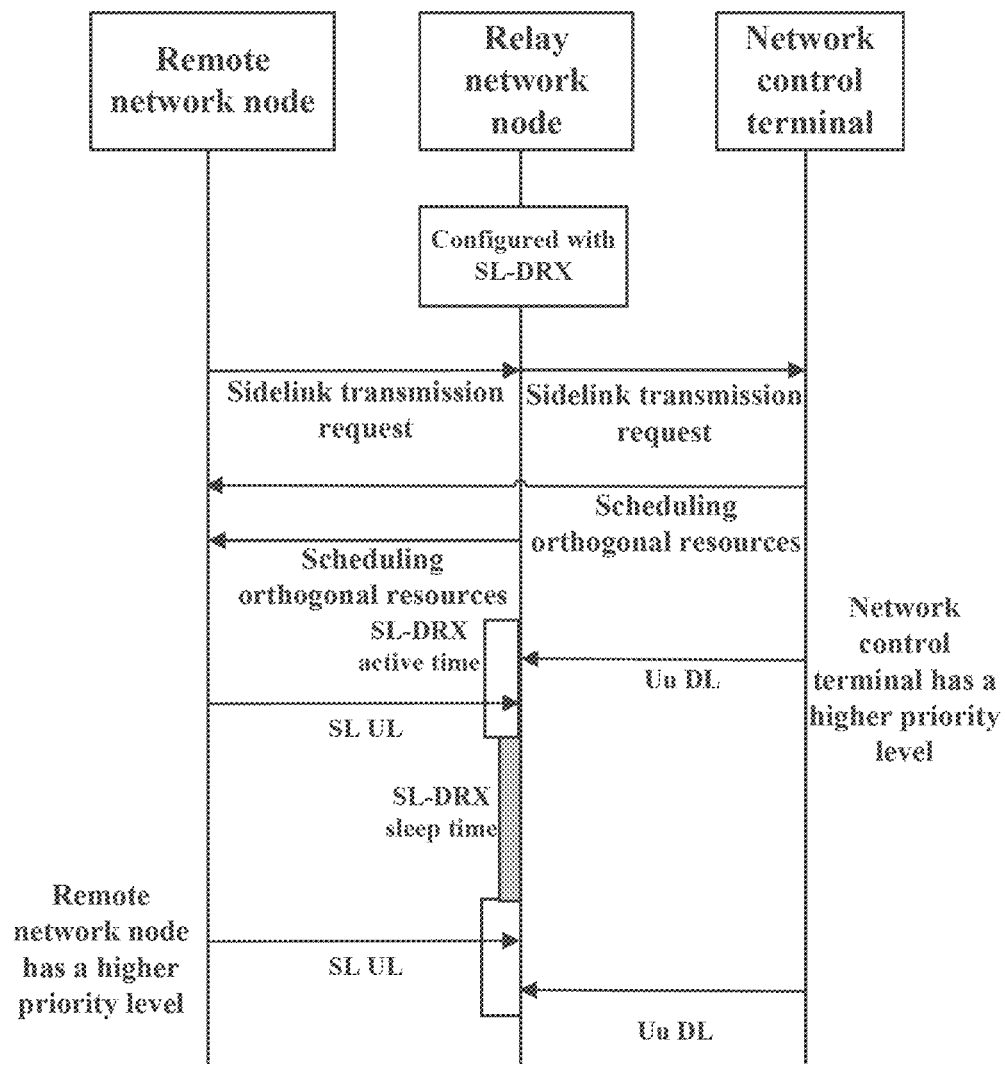
FIG. 7 shows a schematic diagram of an information procedure in the case of centralized scheduling by a network control terminal.

FIG. 7 shows a schematic diagram of an information procedure in the case of centralized scheduling by a network control terminal, in which the conflict avoidance at the relay network node is taken as an example. The case that the general link has a higher priority level and the case that the sidelink has a higher priority level are respectively shown in two SL-DRX ActiveTime, where SL represents the sidelink, Uu represents the general link, UL represents the uplink, DL represents the downlink, the sleep time of SL-DRX is indicated by a gray-filled block, and SL-DRX ActiveTime is indicated by a blank block. FIG. 7 shows that the network control terminal directly schedules orthogonal resources to the remote network node, which is the one-way relay scenario shown in FIG. 2. In the two-way relay scenario shown in FIG. 1, the network control terminal schedules orthogonal resources to the remote network node via the relay network node. It can be seen that the centralized scheduling of resources by the network control terminal makes the transmission resources of the uplink sidelink and the general downlink orthogonal, which can effectively avoid or reduce the occurrence of conflict and improve energy efficiency and quality of service.

As described above, while SL-DRX is applied on the sidelink, DRX may also be applied on the general downlink between the network control terminal and the network node, where the network node may be a relay network node, or may also be a remote network node. In this case, the downlink data transmission from the network control terminal to the network node will only appear in the DRX ActiveTime. Since the DRX ActiveTime may be affected by many factors, the SL-DRX ActiveTime and the DRX ActiveTime may overlap, and thus data conflict occurs.

In the case of centralized scheduling by the network control terminal, the determining unit 101 may be configured to allocate receiving resources orthogonal to each other to the DRX and the SL-DRX, so that the occurrence of conflict cast be avoided.

Figure 8:
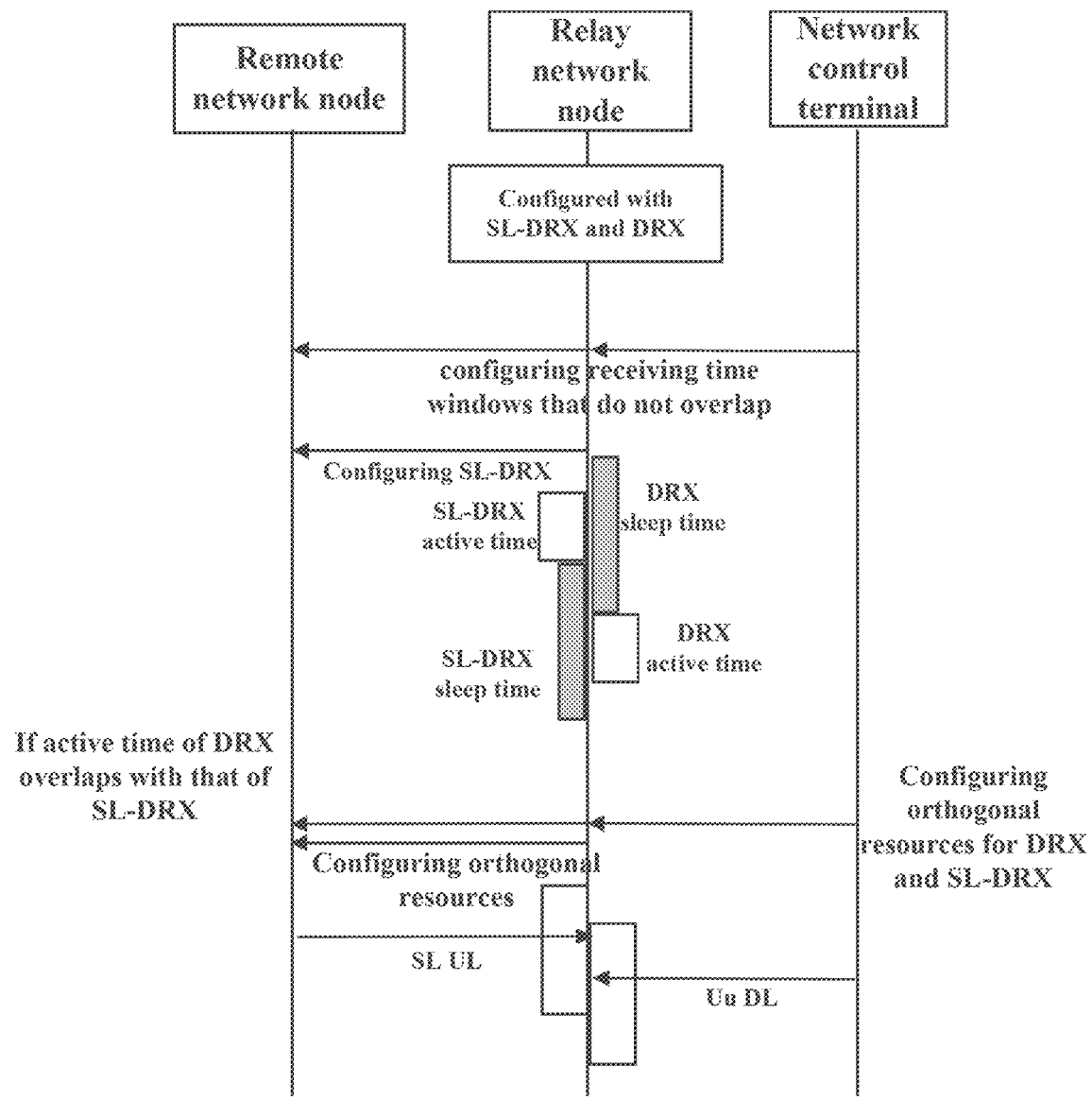
FIG. 8 shows a schematic diagram of an information procedure for a network control terminal to coordinate DRX and SL-DRX.

Still taking the relay network node as an example, FIG. 8 shows a schematic diagram of an information procedure for the network control terminal to coordinate DRX and SL-DRX. It should be understood that the information procedure is similar for the remote network node. For example, the determining unit 101 may allocate, to DRX and SL-DRX, receiving time windows independent of each other in time domain. As shown in the upper part of FIG. 8, the SL-DRX ActiveTime and the DRX ActiveTime are separated in time domain, and thus conflict can be completely avoided.

The DRX and SL-DRX may be reconfigured to make the receiving time windows of the two orthogonal to each other, thereby avoiding conflict. In addition, even when the receiving time windows of the two overlap, the receiving resources of the network node on the two links can also be made orthogonal in time domain, that is, receiving at different times, in a manner of scheduling resources by the network control terminal, as shown in the lower part of FIG. 8. The signaling overhead of the manner that the network control terminal schedules resources is relatively small. Therefore, when the time windows overlap, the resource scheduling manner can be preferentially used to resolve the conflict.

In this scheme, centralized scheduling by the network control terminal to coordinate the transmission of the general link and the sidelink for the network node can effectively avoid conflict, and improve quality of service and energy efficiency.

Scheme 2

In this example, the general downlink transmission for the relay network node and the sidelink transmission for the relay network node may be coordinated by the relay network node. For example, the relay network node may schedule resources to be used by the remote network node to avoid conflict.

Illustratively, the determining unit 201 in the electronic apparatus 200 for the network node may be configured to allocate resources that are orthogonal to those used by the general downlink transmission from the network control terminal to the relay network node, to the sidelink transmission from the remote network node to the relay network node so as to avoid conflict. Similar to the case of centralized scheduling by the network control terminal in scheme 1, a similar resource scheduling is performed in this scheme, except that the subject of execution is the relay network node instead of the network control terminal, as indicated by the dashed line arrow in FIG. 7.

As described above, while SL-DRX is applied on the sidelink, DRX may also be applied on the general downlink between the network control terminal and the network node. In this case, the determining unit 201 may be configured to allocate to the SL-DRX die receiving resources that are orthogonal to those allocated to the DRX.

For example, the determining unit 201 may allocate to the SL-DRX a receiving time window independent of that of the DRX in time domain. In addition, even when the receiving time windows of the two overlap, the determining unit 201 can also cause the receiving resources of the relay network node on the two links to be orthogonal in time domain, that is, receiving at different times, by a manner of scheduling resources, as shown by the lower dashed line arrow in FIG. 8.

Scheme 3

In the scenario where the remote network node autonomously selects resources, the relay network node acts as a "middleman" between the network control terminal and the remote network node, and can coordinate the transmission of the general link and the sidelink to avoid conflict.

The scenario includes tire following two situations: first, the remote network node is in the coverage range of the network control terminal, and the transmission resources selected by the remote network node may overlap with the general downlink transmission resources, this is because the resources in the resource pool of transmission resources may be orthogonal or non-orthogonal to the cellular resources: second, the remote network node is outside of the coverage range of the network control terminal and uses the pre-configured transmission resources, and at this moment, the network control terminal does not know which resources are selected by the remote network node for transmission, so the transmission resources may also overlap with the general downlink transmission resources.

In this scenario, the relay network node knows its SLDRX configuration and SLDRX ActiveTime. However, the data transmitted by the network control terminal is unpredictable, so the relay network node can notify the network control terminal when it is in a sleep state on the sidelink. Whenever the relay network node is in the sleep state on the sidelink, the network control terminal may transmit data or control information to it.

Specifically, the determining unit 201 may be configured to generate an indication for indicating the network control terminal that the sidelink of the relay network node enters the sleep state, and the indication is transmitted to the network control terminal, for example, by the transceiving unit 203. The indication may be, for example, that the relay network node transmits a SLDRX-sleep indicator to the network control terminal through the MAC layer in one sub-frame after the SLDRX-onDuration Timer, and informs the network control terminal that the relay network node is about to enter sleep state on the sidelink. After receiving the indication, the network control terminal determines that the relay network node will be able to receive information of the general downlink transmission.

Accordingly, the determining unit 101 of the electronic apparatus 100 for the network control terminal may be configured to schedule the general downlink transmission from the network control terminal to the relay network node according to the SL-DRX sleep indicator from the relay network node, where the SL-DRX sleep indicator indicates that the sidelink of the relay network node enters the sleep state.

For example, the network control terminal, knows the configuration of the SL-DRX of the relay network node such as the SLDRX-cycle and the SLDRX-startoffset, and thus can calculate a wake-up time of the relay network node. The network control terminal may transmit downlink data to the relay network node during the time period before the wake-up. When the time is over, the network control terminal should stop transmitting downlink data and wait for the next SLDRX-sleep Indicator. If DRX is used between the network control terminal and the relay network node, the network control terminal may adjust the time when the data is transmitted according to the SL-DRX sleep indicator, so that it transmits data during time when the SLDRX sleeps and within the DRX ActiveTime.

Figure 9:
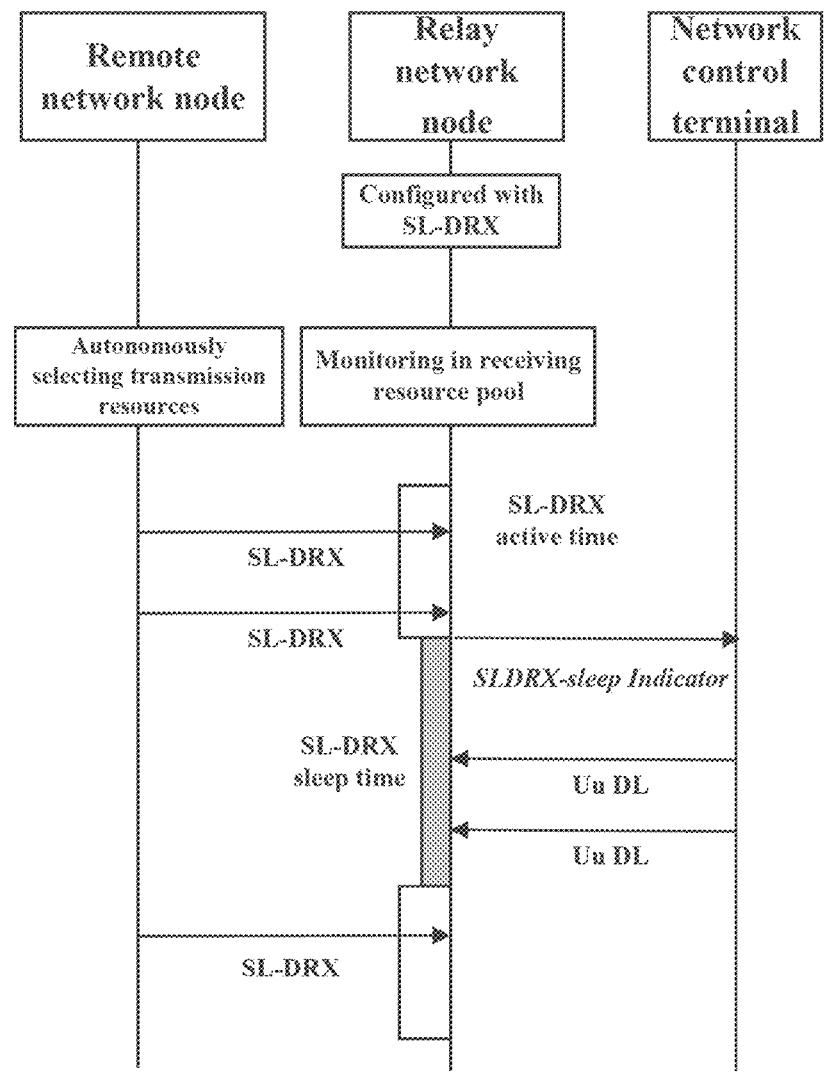
FIG. 9 shows a schematic diagram of an information procedure for a coordination based on a SL-DRX sleep indicator.

FIG. 9 shows a schematic diagram of an information procedure for coordination based on the SL-DRX sleep indicator, where after receiving the SLDRX-sleep indicator, the network control terminal transmits data to the relay network node during the sleep time of the SL-DRX. It can be seen that this scheme avoids data conflict at the relay network node by newly added signaling, and improves network energy efficiency.

In addition, the above coordination based on the SL-DRX sleep indicator may also be combined with the scheme 1, thereby avoiding that the network control terminal needs to schedule resources on each sub-frame, so that the service efficiency can be improved while reducing energy consumption.

Scheme 4

Still with respect to the scenario of scheme 3, in order not to add additional signaling, in the present scheme 4, the relay network node performs random receiving based on the "first come, first receive" principle, and resolves conflict by specific settings.

Furthermore, this scheme is applicable not only to the relay network node, but also to the remote network node where the conflict between the general downlink transmission and sidelink transmission may occur. Therefore, in this scheme, a network node that transmits data to a network node in question through a sidelink is referred to as another network node.

For example, the network node receives one of data from the network control terminal and data from another network node, in accordance with a time-first principle. The determining unit 201 is configured to start a timer when receiving begins, and stop receiving when duration of the timer exceeds a predetermined time length.

Specifically, the network node receives data from a sidelink or a general link in a chronological order. For example, the network node detects on the general link or detects on the SLDRX ActiveTime. Assuming that the network node first receives data on one of the links, the network node remains reception on it until the information on the link is completely received, as shown in (1) to (3) in FIG. 10. If the network node first receives data on the general downlink, but the SLDRX-onDurationTimer is started during reception, the network node keeps reception on the general link regardless of the data transmission on the sidelink, as shown in (4) to (7) in FIG. 10.

Other network nodes that transmit data through the sidelink can retransmit. However, there is the following case: in the next SLDRX-cycle, the network control terminal transmits data to the network node again before the SLDRX-onDurationTimer starts, causing the network node to to miss its receiving time window for other network nodes again, as shown in (8) and (9) in FIG. 10. Of course, there is also a case where the data of the sidelink always takes precedence.

Therefore, a timer SLConflict-Timer can be maintained on the network node side in consideration of the fairness of the network control terminal and the other network nodes and QoS. If the duration of the SLConflict-Timer exceeds the predetermined time length, it means that the network node may have missed too much transmission data of another link. At this time, the network node can stop the current reception and detect another link, as shown in (10) to (12) in FIG. 10.

Figure 10:
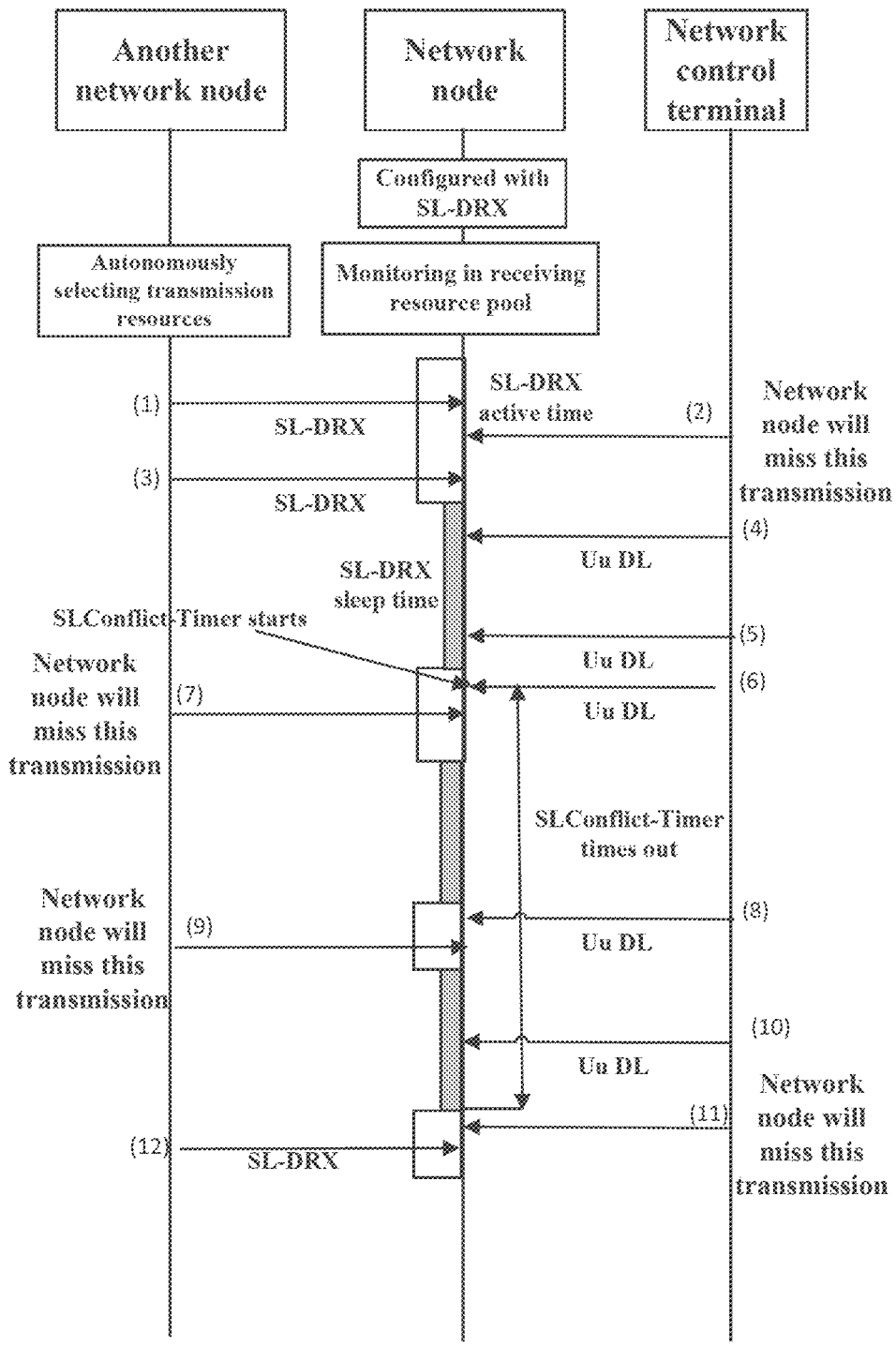
FIG. 10 shows a schematic diagram of an information procedure for a relay network node to receive based on the "first come, first receive" principle.

FIG. 10 shows a schematic diagram of an information procedure for a relay node to receive based on the "first come, first receive" principle. As shown in FIG. 10, for example, the network node first receives the data (6) from the network control terminal during the SLDRX-onDurationTimer when the SL should be received. The network node keeps receiving on the general link and starts the SLConflict-Timer to start timing, regardless of whether there is data transmission on the sidelink. Therefore, the meaning of the SLConflict-Timer at this moment is equivalent to the cumulative sleep time length on the sidelink. If the network node successfully receives data from the sidelink in the next SLDRX-onDurationTimer, that is, the network control terminal ends the data transmission before the timeout of the SLDRX-onDurationTimer, the SLDRX-onDurationTimer directly jumps out of the timing state without taking any action. Until the data from the general link is first received during the next SLDRX-onDurationTimer the timing is restarted. For example, the duration of the timer can be an integer multiples of the SL-DRX cycle.

As shown in FIG. 10, if the SLConflict-Timer times out, the network node may stop receiving data from the network control terminal and preferentially process the data on the sidelink. It can be seen that in the case where SLConflict-Timer times out, the network node will preferentially receive data from other network nodes, and even if the network control terminal still has data to transmit, the network node will miss the data.

In the above description, the general link between the network control terminal and the network node does not use DRX, and the scheme in which the general link uses DRX will be described below.

For example, the determining unit 201 may be configured to, if the receiving time windows of the DRX and SL-DRX overlap, generate an adjusting indication for adjusting the configuration of the DRX or SL-DRX, to instruct the network control terminal or the other network node to adjust the configuration of the DRX or SL-DRX.

The network node knows the configuration and the wake-up time (i.e., the receiving time window) of the DRX and SL-DRX. If the receiving time windows overlap, the network node can notify the other network node and the network control terminal of the status of the two links, and select one side to delay reception, such as notifying the network control terminal or the other network node to adjust the configuration of the discontinuous reception on that side.

As a case, SL-DRX wakes up before DRX, and the network node should keep receiving on the sidelink until SLDRX-onDurationTimer or SLDRX-Inactivity/Timer times out. If the DRX-onDurationTimer is started during this period, the network node should notify the network control terminal to adjust the DRX configuration for it to avoid the recurrence of overlap in the next DRX cycle. This can be implemented by generating by the determining unit 201 the indication for adjusting the DRX configuration and transmitting it by the transmitting unit 203 to the network control terminal.

For example, the transmission unit 203 may transmit an adjusting indication DRX-Adjust Indicator to the network control terminal through the MAC layer on the sub-frame after she SLDRX-onDuartionTimer ends.

Figure 11:
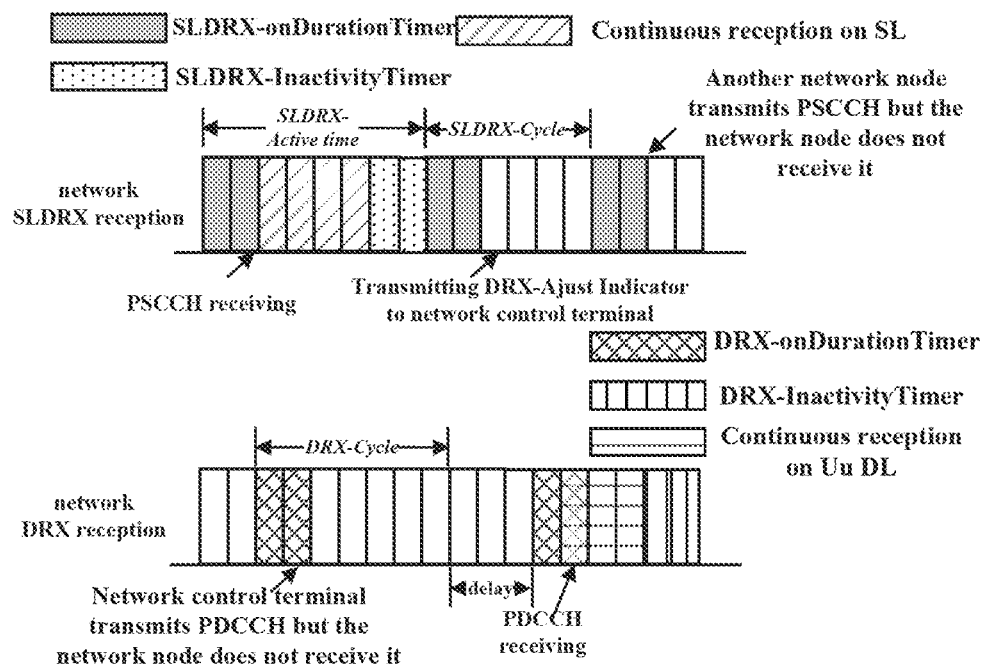
FIG. 11 shows a schematic diagram of a sub-frame configuration on a general link and a sidelink in the case where SL-DRX wakes up before DRX.

Accordingly, the determining unit 101 of the electronic apparatus 100 for the network control terminal can adjust the DRX configuration of the network node according to the adjusting indication. For example, the network control terminal updates the DRX-startoffset of the network node, that is, shifts the start time of the DRX cycle afterwards by a period of time to ensure that the time windows of the DRX and SL-DRX do not overlap next time. FIG. 11 shows a schematic diagram of a sub-frame configuration on a general link and a sidelink in this case, wherein the tipper half shows the sub-frame configuration of the sidelink and the lower half shows the sub-frame configuration of the general link. In FIG. 11, the start time of the DRX cycle is shifted afterwards by three sub-frames.

Figure 12:
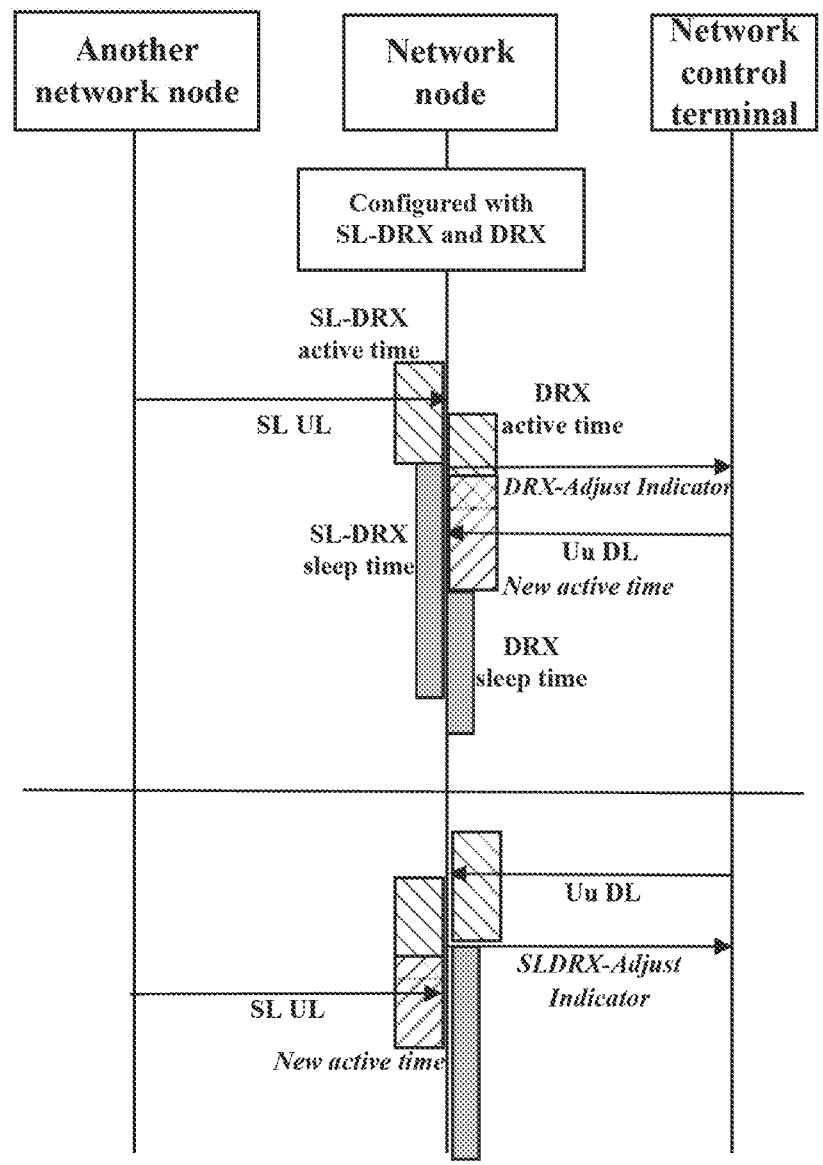
FIG. 12 shows a schematic diagram of an information procedure for a relay network node to receive based on the "first come, first receive" principle in the case of using DRX and SL-DRX.

Further, the determining unit 201 may be further configured to calculate an adjusting amount to instruct the network control terminal to adjust the configuration of the DRX according to the adjusting amount. In this example, the adjusting amount is the time length of afterwards shift. Of course, the adjusting amount may also be a preset value. Accordingly, the upper half of FIG. 12 shows an example of the information procedure in this case, wherein the diagonal line filled block represents the adjusted ActiveTime of the DRX, and it can be seen that the ActiveTime of the DRX falls within the sleep time of the SLDRX, so that conflicts can be avoided.

As another case, DRX may wake up before SL-DRX, and the network node should keep receiving on the general link until the DRX-onDurationTimer or DRX-InactivityTimer tunes out. If the SL-DRX onDurationTimer is started during this period, the network node should notify the network control terminal, so that the network control terminal adjusts the SL-DRX configuration for the network node, which can be implemented by generating by the determining unit 201 the indication for adjusting the SL-DRX configuration and transmitting it by the transmitting unit 203 to the network control terminal.

For example, the transmitting unit 203 may transmit an adjusting indication DRX-Adjust Indicator to the network control terminal through the MAC layer on the sub-frame after the DRX-onDurationTimer ends.

Accordingly; the determining unit 101 of the electronic apparatus 100 for the network control terminal can adjust the SL-DRX configuration of the network node according to the adjusting indication. For example, the network control terminal updates the SLDRX-startoffset for the network node, that is, shifts the start time of the SL-DRX cycle afterwards by a period of time to ensure that the tune windows of the DRX and SL-DRX do not overlap next time. Similarly, the time length of the afterwards shift may be determined by the determining unit 201 and provided to the network control terminal, or may be a preset value. The lower half of FIG. 12 shows an example of the information procedure in this case. Similarly, the diagonal line filled block represents the adjusted ActiveTime of the SL-DRX. It can be seen that the ActiveTime of the SL-DRX falls within the sleep time of the DRX, so that conflicts can be avoided.

Furthermore, if the SL-DRX of the network node is configured by another network node, the transmitting unit 203 transmits the adjusting indication to the other network node, so that the other network node adjusts the SL-DRX configuration of the network node. Similarly the amount of adjusting may be determined by the determining unit 201 and provided to the other network node, or may be a preset value.

Scheme 5

In this scheme, a scenario in which a conflict between a general downlink transmission and a sidelink transmission from a relay network node to a remote network node occurs at the remote network node is considered, and the remote network node resolves the conflict with the assistance of the relay network node. Therefore, the scheme actually belongs to the scope that the relay network node coordinates the two kinds of transmissions.

For example, the determining unit 201 of the electronic apparatus 200 for the relay network node may be configured to, after the relay network node completes the data transmission to the remote network node, generate the indication for indicating to the network control terminal that the sidelink of the remote network node enters a sleep state. In this way, the network control terminal can transmit, data to the remote network node during the following period. Moreover, the network control terminal or the relay network node can also update the SL-DRX configuration of the remote network node such as SLDRX-StartOffset.

Accordingly, the determining unit 101 of the electronic apparatus 100 for the network control terminal may be configured to schedule the general downlink transmission from the network control terminal to the remote network node according to the SL-DRX remote sleep indicator from the relay network node (such as represented by the SLDRX-remoteSleepIndicator), wherein the SL-DRX remote sleep indicator indicates that the sidelink of the remote network node enters a sleep state.

Furthermore, in the case where DRX is used between the network control terminal and the remote network node, the determining unit 101 may be further configured to, after the network control terminal completes the data transmission to the remote network node, generate a UuDRX remote sleep indicator (such as represented by the UuDRX-remoteSleepIndicator) for indicating to the relay network node that the DRX of the remote network node enters a sleep time. In this way, the relay network node can transmit data to the remote network node during the following period.

Accordingly, the determining unit 201 can be configured to update the SL-DRX configuration of the remote network node according to the UuDRX remote sleep indicator from the network control terminal, wherein the UuDRX remote sleep indicator indicates that the DRX of the remote network node enters a sleep time. On the other hand, if the SL-DRX of the remote network node is controlled by the network control terminal, the determining unit 101 updates the SL-DRX configuration of the remote network node.

Figure 13:
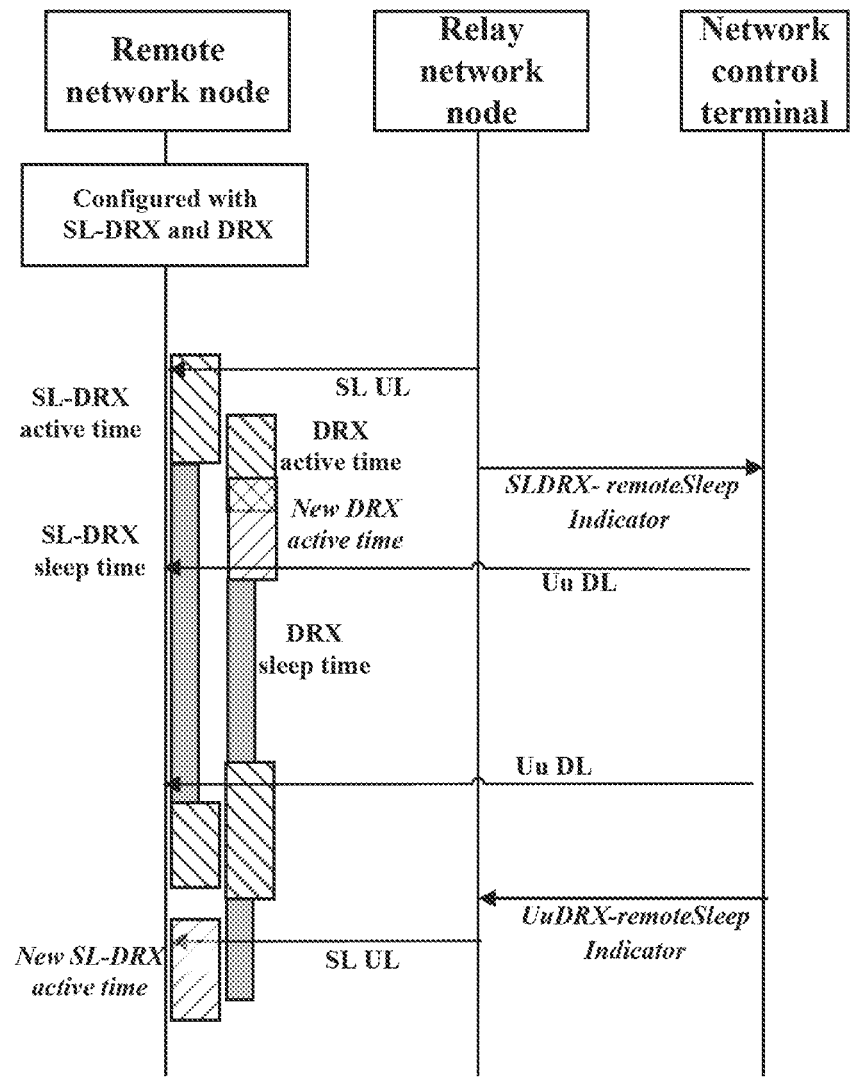
FIG. 13 shows a schematic diagram of an information procedure for an example in which a remote network node performs conflict resolution with the assistance of a relay network node.

FIG. 13 shows a schematic diagram of the information procedure of the scheme. The remote network node is configured with DRX and SL-DRX. After completing the data transmission, the relay network node transmits the SLDRX-remoteSleepIndicator to the network control terminal, and then the network control terminal updates the SL-DRX configuration of the remote network node and transmits data to the remote network node. It can be seen that the new ActiveTime of the DRX falls within the sleep time of SL-DRX, and thus conflicts can be avoided. In addition, after completing the data transmission to the remote network node, the network control terminal transmits the UuDRX-remoteSleepIndicator to the relay network node, and the relay network node updates the SL-DRX configuration of the remote network node according to the indicator, and transmits data to the remote network node during the subsequent SL-DRX ActiveTime. Similarly, the updated SL-DRX ActiveTime falls within the sleep time of the DRX, and thus conflicts can be avoided.

Various coordination schemes for the general downlink transmission and the sidelink transmission have been described above, and it should be understood that these are merely examples, and the mode of coordination is not limited thereto. By coordinating the two kinds of transmission, data conflicts at the network node can be effectively avoided, and network energy efficiency and QoS can be improved.

Fourth Embodiment

In this embodiment, a scenario in which one relay network node connects to a plurality of remote network nodes will be considered. For the downlink of the sidelink, the relay network node can easily perform data transmission to the plurality of remote network nodes in a scheduling mode. For the uplink of the sidelink, since the relay network node cannot receive data from the plurality of remote network nodes at the same time, and therefore, the issue of resolving data conflicts that may occur needs to be considered.

It can be understood that the above problem can be easily solved when the resources to be used by the remote network nodes are centralized scheduled by the network control terminal, or the relay network node. Therefore, this embodiment mainly discusses a case in which a remote network node autonomously selects resources.

In an example, the determining unit 201 in the electronic apparatus 200 for the network node is configured to distribute a receiving order to each of the remote network nodes, respectively, and detect the PSCCH for the respective remote network node at the sub-frame position determined according to the receiving order.

Figure 14:
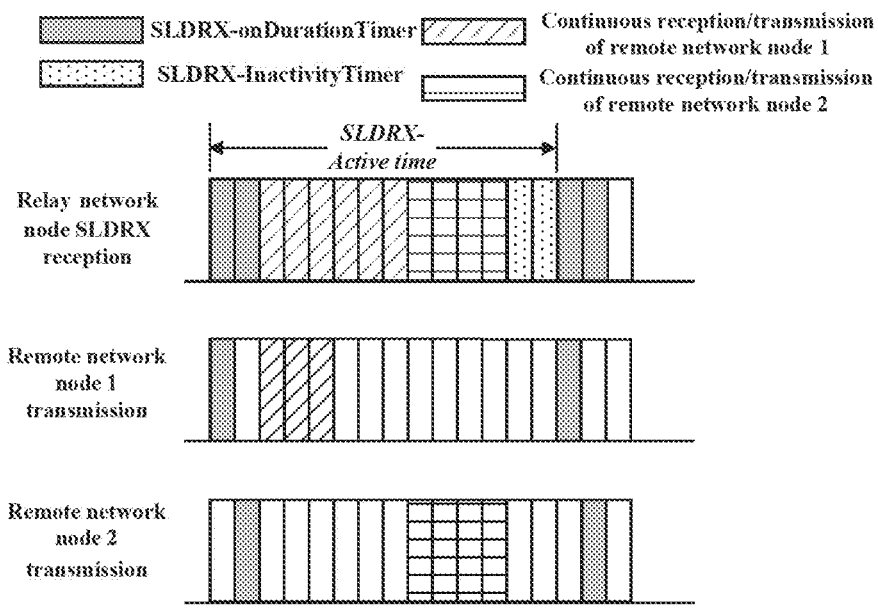
FIG. 14 shows a diagram of an example of division and allocation of an SLDRX-on DurationTimer.

As described above, the relay network node detects the PSCCH within the SLDRX-onDurationTimer. The SLDRX-onDurationTimer can be divided into X parts, which are respectively allocated to each remote network node for detection of the PSCCH. FIG. 14 shows an example in which the SLDRX-onDurationTimer is divided into 2 parts and the 2 parts are respectively allocated to the remote network node 1 and the remote network node 2. That is, the PSCCH detection of the remote network node 1 is performed on the first sub-frame after the SL-DRX wakes up, and the PSCCH detection of the remote network node 2 is performed on the second sub-frame.

The relay network node can sort the remote network nodes according to their priority levels and delay tolerance, and give each remote network node a RemoteUEOrder. Each remote network node can calculate its own SL-DRX onDurationTimer and SL-DRX startoffset according to its own RemoteUEOrder. Further, the determining unit 201 is further configured to reserve, for each remote network node, PSCCH sub-frames for continuous reception. In this way, when the transmission data of some remote network nodes, such as wearable devices, is relatively stable, the relay network node can be effectively prevented from frequently switching between the wake-up state and the sleep state.

The lengths of PSCCH sub-frames for continuous reception allocated to each remote network node may be set to different values according to the service characteristics of the corresponding remote network node, or of course, may also be set to the same value. For a remote network node which has a stable, predictable amount of transmission data and transmission cycle, such as some wearable devices, a fixed length for continuous reception of PSCCH sub-frames can be allocated to it. As shown in FIG. 14, the relay network node sequentially receives the PSCCHs from the remote network node 1 and the remote network node 2 within the SLDRX-onDurationTimer. The remote network node 1 and the remote network node 2 can learn their own transmission time windows according to their RemoteUEOrder and the length of continuously received PSCCH sub-frames. Assuming that the priority level of the remote network node 1 is higher, the relay network node first detects the PSCCH from the remote network node 1 in 6 continuously received PSCCH sub-frame (but may not actually receive the PSCCH sub-frame, for example, in FIG. 14, the remote network node 1 only transmits 3 sub-frames, so the relay network node will only receive 3 sub-frames). When the reception for the remote network node 1 ends and the continuous reception of PSCCH sub-flames for the remote network node 2 starts, the relay network node begins to detect the PSCCH from the remote network node 2.

In addition, a portion of the remote network nodes may be allocated a fixed length of continuous reception of PSCCH sub-frames, while other remote network nodes may be allocated a dynamically varying length of continuous reception PSCCH sub-frames. Alternatively, all remote network nodes may also be allocated dynamically varying lengths of continuous reception of PSCCH sub-frames.

For example, the RemoteUEOrder of the remote network node with a fixed length of continuous reception of PSCCH sub-frames may be set to the front, and still taking FIG. 14 as an example, it is assumed that the length of continuously received PSCCH sub-frames for the remote network node 1 is 6, the length of continuously received PSCCH sub-frames for the remote network node 2 varies dynamically. If there is still a remote network node 3, the determining unit 201 needs to determine the start position for receiving sub-frames for the remote network node 3 according to the actual length of continuously received PSCCH sub-frames for the remote network node 2. If there are more remote network nodes, their start positions for receiving sub-frames are sequentially obtained according to the actual lengths of continuously received PSCCH sub-frames for the previous remote network nodes.

Therefore, the determining unit 201 is configured to, in the case where the number for continuous reception of PSCCH sub-frames of the previous remote network node varies dynamically, generate information for the start position for receiving sub-frames of the next remote network node to indicate to the next remote network node. The transmitting unit 203 transmits the information for the start position for receiving sub-frames to the corresponding remote network node.

Further, the determining unit 201 is further configured to periodically update the configuration of the SL-DRX of the relay network node. For example, the transmitting unit 203 can transmit the updated SL-DRX configuration to a remote network node of the relay network node.

Figure 15:
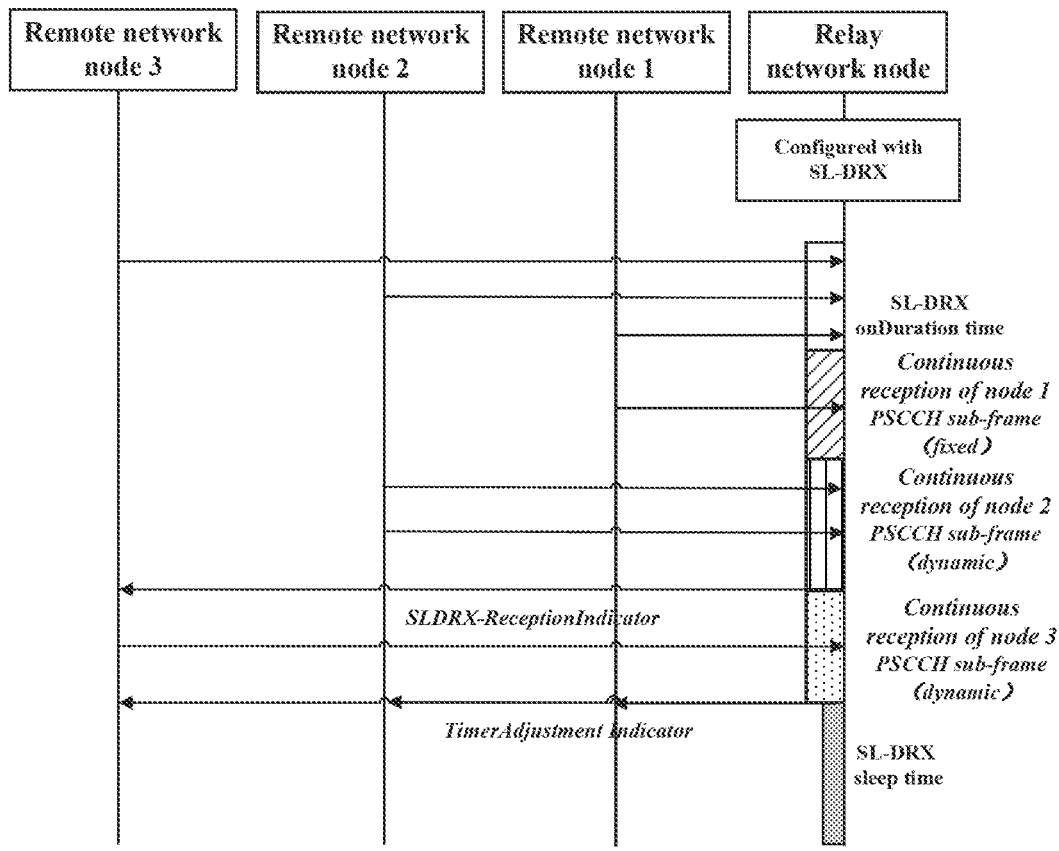
FIG. 15 shows a schematic diagram of an information procedure in a one-to-many relay scenario.

Illustratively, the transmitting unit 203 can transmit by way of broadcast. For example, the transmitting unit 203 notifies each remote network node of the SLDRX-startoffset of the next SLDRX-onDurationTimer by broadcasting a TimerAdjusting Indicator to them. In this way, each remote network node can use its RemoteUEOrder to calculate the SLDRX-onDurationTimer sub-frame position configured for itself by the relay network node in the next SLDRX-Cycle. FIG. 15 shows a schematic diagram of the information procedure for the example, with blank blocks, diagonal line filled blocks, vertical-filled blocks and dot-filled blocks respectively representing the SLDRX-onDurationTime, and the continuous received PSCCH sub-frames for the remote network nodes 1-3. Since the number of continuously received PSCCH sub-frames for the remote network node 2 varies dynamically, it is necessary to transmit the information SLDRX-ReceptionIndicator for the start position for receiving sub-frames to the remote network node 3. Each remote network node transmits data within the continuous reception PSCCH sub-frames allocated to itself, and after the SLDRX-Cycle ends, the relay network node broadcasts the updated SL-DRX configuration to each remote network node.

In order to ensure the accuracy and real-time of the SL-DRX, the relay network node needs to periodically update the timer of the SL-DRX with a plurality of remote network nodes. The update cycle may be, for example, configured by the network control terminal or determined by the relay network node itself. By setting this cycle reasonably, a balance between service continuity and energy efficiency can be achieved.

In another example, the determining unit 201 may be configured to randomly select one of a plurality of remote network nodes or select the remote network node with the highest priority level to receive its data, in the case where the relay network node simultaneously detects the PSCCH from the plurality of remote network nodes. In this example, the relay network node does not perform any coordination. In the SLDRX-onDurationTimer for the relay network node, when it first detects the PSCCH from a certain remote network node, it starts the SLDRX-InactivityTimer and keeps a continuous reception for the remote network node. If the relay network node receives PSCCHs from the plurality of remote network nodes at the same time, the relay network node randomly selects one remote network node or selects the one with the highest priority level to receive and respond. Those remote network nodes that do not receive a response from the relay network node can only wait until the next wake-up time of the relay network node. Similarly, when the SLDRX-Cycle ends, the relay network node should broadcast, to each remote network node, an updated SL-DRX configuration, that is, the timers of the SL-DRX.

In this embodiment, the relay network node can avoid conflicts occurring when receiving data on a plurality of sidelinks by coordination or random reception.

Fifth Embodiment

In the process of describing the electronic apparatus in the embodiments described above, obviously, some processing and methods are also disclosed. Hereinafter, an overview of the methods is given without repeating some details disclosed above. However, it should be noted that, although the methods are disclosed in a process of describing the electronic apparatus, the methods do not certainly employ or are not certainly executed by the aforementioned components. For example, the embodiments of the electronic apparatus may be partially or completely implemented with hardware and/or firmware, the method described below may be executed by a computer-executable program completely, although the hardware and/or firmware of the apparatus can also be used in the methods.

Figure 16:
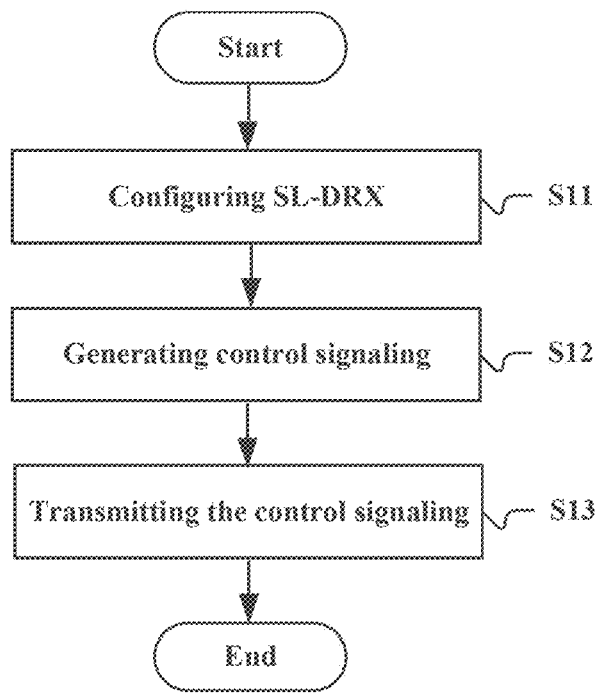
FIG. 16 shows a flowchart of a method for an electronic apparatus for a network control terminal according to an embodiment of the present application.

FIG. 16 shows a flowchart of a method for an electronic apparatus for a network control terminal, and the method includes: with respect to a sidelink between a relay network node and a remote network node, configuring discontinuous reception SL-DRX for the relay network node and/or the remote network node (S11); and generating a control signaling including configuration of the SL-DRX, to indicate to the relay network node and/or the remote network node (S12).

For example, the discontinuous reception SL-DRX may be configured for the relay network node and or the remote network node by determining an active time for the relay network node and/or the remote network node to detect the PSCCH and a sleep time for the relay network node and/or the remote network node not to detect the PSCCH.

For example, the configuration of the SL-DRX includes: a SLDRX-onDurationTimer for indicating the number of continuous PSCCH sub-frames for the network node to detect the PSCCH after the network node wakes up from the sleep state; a SLDRX-InactivityTimer for indicating the maximum number of PSCCH sub-frames for the network node to wait for successfully decoding of the PSCCH; a SLDRX-Cycle for indicating the number of sub-frames included in one SL-DRX cycle; and a SLDRX-StartOffset for indicating a sub-frame position where each SL-DRX cycle starts.

Furthermore, as indicated by the dashed line block in FIG. 16, the above method further includes the step S13 of transmitting the control signaling to the relay network node and/or the remote network node. For example, the transmission can be performed by RRC signaling.

For example, a control signaling including the SL-DRX configuration of a relay network node and a remote network node may be transmitted to the relay network node in step S13, wherein the SL-DRX configuration of the remote network node is forwarded by the relay network node.

Furthermore, although not shown in FIG. 16, the above method may further include the step of allocating mutually orthogonal resources to the following two transmissions to avoid conflict: a general downlink transmission from the network control terminal to the relay network node; and a sidelink transmission from the remote network node to the relay network node; i.e., the general downlink transmission for the network node and the sidelink transmission for the network node. Alternatively, mutually orthogonal resources may be allocated to the following two transmissions to avoid conflict: a general downlink transmission from the network control terminal to the remote network node; and a sidelink transmission from the relay network node to the remote network node. For example, the transmission order of the general link and the sidelink may also be set according to their priority levels, and the SL-DRX configuration of the relay network node or the remote network node may be updated according to the transmission order.

In an example, a general downlink transmission from a network control terminal to a relay network node may be scheduled according to a SL-DRX sleep indicator from a relay network node, wherein the SL-DRX sleep indicator represents that the sidelink of a relay network node enters a sleep state.

In another example, the general downlink transmission from the network control terminal to the remote network node may be scheduled according to the SL-DRX remote sleep indicator from the relay network node, wherein the SL-DRX remote sleep indicator represents the sidelink of a remote network node enters the sleep state.

In the case where DRX is used between the network control terminal and the network node, it is possible to allocate mutually orthogonal receiving resources to DRX and SL-DRX. For example, DRX and SL-DRX can be allocated receiving time windows independent of each other in time domain.

In the case where DRX is used between the network control terminal and the network node, the configuration of the DRX or SL-DRX of the network node can also be adjusted according to the adjusting indication from the network node.

In the case where DRX is used between the network control terminal and the remote network node, the UuDRX remote sleep indicator may be generated alter the network control terminal completes the data transmission to the remote network node for indicating to the relay network node that the DRX of the remote network node enters a sleep time. In addition, the configuration of the SL-DRX of the remote network node can be updated.

Figure 17:
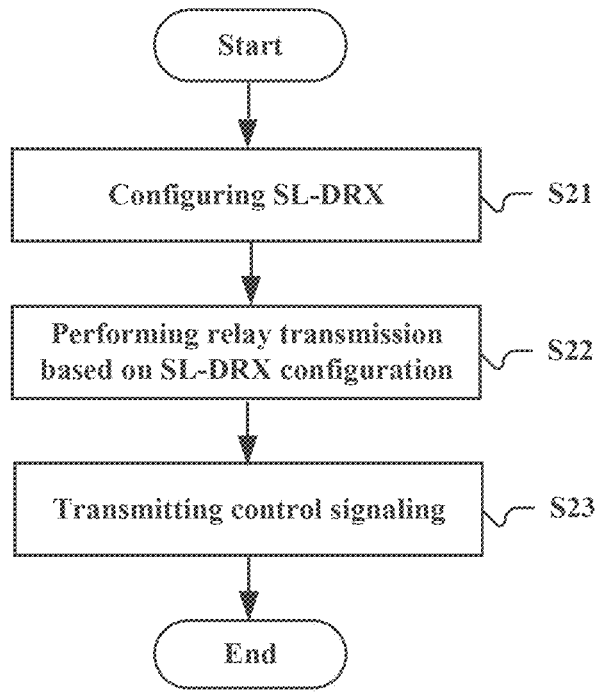
FIG. 17 shows a flowchart of a method for an electronic apparatus for a network node according to an embodiment of the present application.

FIG. 17 shows a flowchart of a method for an electronic apparatus for a network node according to an embodiment of the present application, and the method includes: with respect to a sidelink between the network node and one or more other network nodes, configuring discontinuous reception (SL-DRX) for the network node and/or the one or more other network nodes (S21); and performing, based on configuration of the SL-DRX, relay transmission between the network node and the one or more other network nodes (S22).

For example, the discontinuous reception SL-DRX may be configured for the network node and/or the one or more other network nodes by determining an active time for the network node and/or the one or more other network nodes to detect the PSCCH and a sleep time for the network node and/or the one or more other network nodes not to detect the PSCCH. For example, the configuration of the SL-DRX includes: a SLDRX-onDurationTimer for indicating the number of continuous PSCCH sub-frames for the network node to detect the PSCCH after the network node wakes up from the sleep state; a SLDHX-InactivityTimer for indicating the maximum number of PSCCH sub-frames for the network node to wait for successfully decoding of the PSCCH; a SLDRX-Cycle for indicating the number of sub-frames included in one SL-DRX cycle; and a SLDRX-StartOffset for indicating a sub-frame position where each SL-DRX cycle starts.

Furthermore, as shown by the dashed line block in FIG. 17, the above method further includes step S13 of transmitting control signaling including the configuration of the SL-DRX of the other network nodes to the corresponding network nodes. The transmission may be performed, for example, by radio resource control (RRC) signaling or broadcast signaling.

In addition, control information instructing other network nodes to enter the SL-DRX sleep state may be transmitted to the other network nodes or received from the other network nodes. The control information can be represented, for example, by a MAC PDU sub-header carrying an LCID.

In an example, the configuration of the SL-DRX is determined in accordance with control signaling from the network control terminal in step S21.

In another example, the configuration of the SL-DRX of one or more other network nodes is determined in accordance with the data to be transmitted by the network node in step S21.

In the case where discontinuous reception DRX is used between the network control terminal and the network node, and in the case where the receiving time windows of the DRX and the SL-DRX overlap, an adjusting indication for adjusting the configuration of the DRX or the SL-DRX may be generated to instruct the network control terminal or the other network nodes to adjust the configuration of the DRX or SL-DRX. The amount of adjusting may also be calculated to instruct the network control terminal or the other network nodes to adjust the configuration of the DRX or SL-DRX based on the amount of adjusting.

The network node may receive one of the data from the network control terminal and the data from the other network nodes according to a time-first principle, for example, the timer may be started at the beginning of reception, and the reception is stopped when the duration of the timer exceeds a predetermined time length to ensure fairness.

In the case that the network node is a relay network node and the other network node is a remote network node, the sidelink transmission from the remote network node to the relay network node may be allocated resources that are orthogonal to resources used by the general downlink transmission from the network control terminal to the relay network node to avoid conflicts. In the case where DRX is used between the network control terminal and the relay network node, the SL-DRX may be allocated receiving resources orthogonal to those for the DRX. For example, the receiving time window independent of that of the DRX in time domain may be allocated to the SL-DRX. An indication for indicating to the network control terminal that the sidelink of the relay network node enters a sleep state may also be generated such that the network control terminal determines that data can be transmitted to the relay network node. In the case where DRX is used between the network control terminal and the remote network node, the SL-DRX configuration of the remote network node may be updated according to the UuDRX remote sleep indicator from the network control terminal, wherein the UuDRX remote sleep indicator indicates the DRX of the remote network node enters a sleep time. After the relay network node completes the data transmission to the remote network node, an indication for indicating to the network control terminal that the sidelink of the remote network node enters a sleep state may also be generated.

In the case of one-to-many relay, each remote network node may be respectively allocated a receiving order, and the PSCCH of the corresponding remote network node is detected at the sub-frame position determined according to the receiving order. In addition, PSCCH sub-frames for continuous reception may be reserved for each remote network node.

In the case where the number of PSCCH sub-frames for continuous reception for the previous remote network node varies dynamically, information for the start position for receiving sub-frame for the next remote network node may also be generated to indicate to the next remote network node.

In addition, in order to ensure accuracy and real-time, the configuration of the SL-DRX of the relay network node can also be periodically updated.

In another example, in a case where a relay network node simultaneously detects PSCCHs from a plurality of remote network nodes, one of the plurality of remote network nodes is randomly selected or the remote network node with the highest priority level is selected to receive its data.

Note that each of the above methods may be used in combination or separately and the details thereof have been described in detail in the first to fourth embodiments, which will be not repeated herein.

In summary, the electronic apparatus and method according to the present application can apply discontinuous reception on the sidelink and adopt various coordination modes, which can effectively reduce the energy consumption of the device performing relay communication and improve the data transmission efficiency.

Application Examples

The technology of the present disclosure is applicable to various products. For example, the above mentioned base station may be realized as any type of evolved Node B (eNB) such as a macro eNB and a small eNB. The small eNB such as a pico eNB, micro eNB and a home (femto-cell) eNB may have a smaller coverage range than a macro cell. Alternatively, the base station may also be implemented as any other type of base stations, such as a NodeB and a base transceiver station (BTS). The base station may include a body (also referred to as a base station device) configured to control wireless communications; and one or more remote radio heads (RRHs) arranged in a different position from the body. In addition, various types of user equipments, which will be described below, may each operate as the base station by temporarily or semi-persistently executing a base station function.

Application Examples Regarding Base Station

First Application Example

Figure 18:
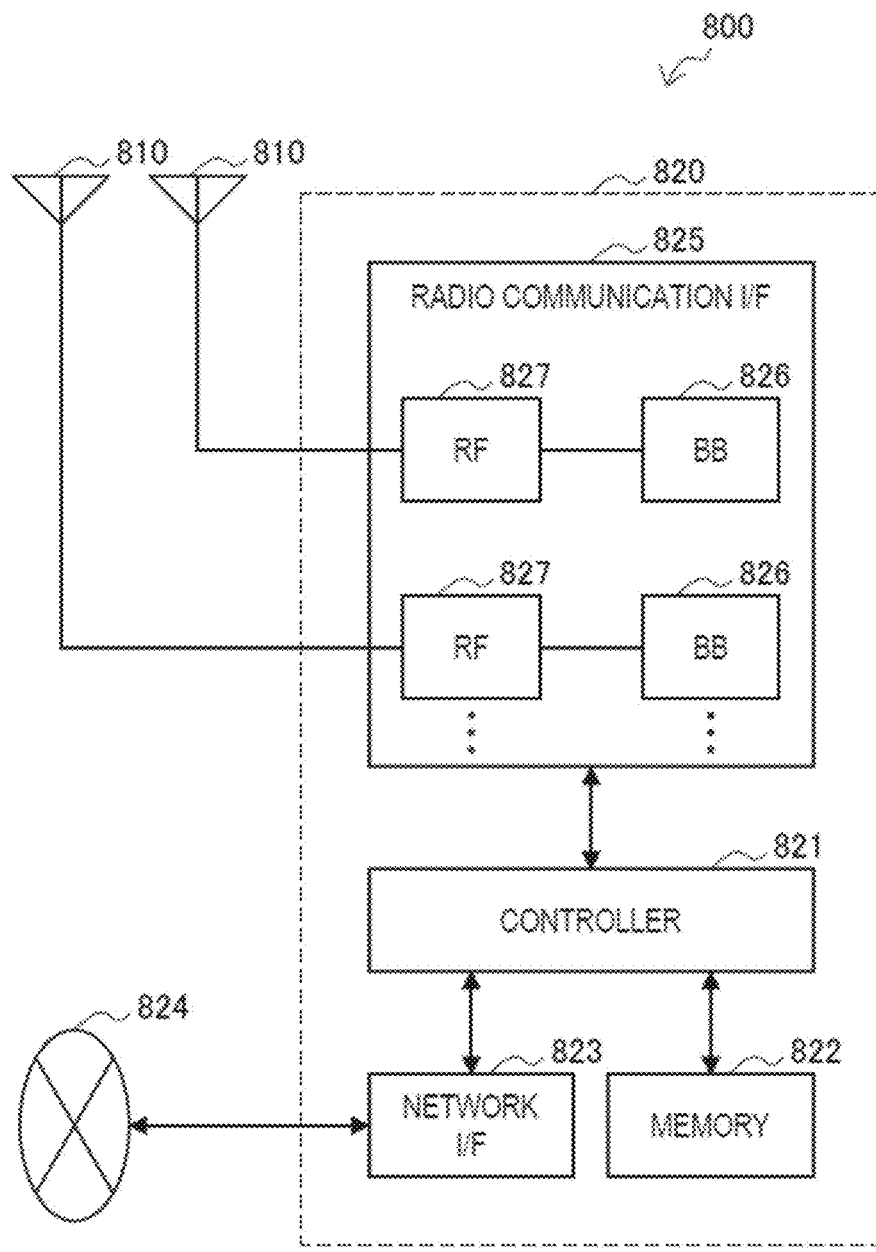
FIG. 18 is a block diagram illustrating a first example of a schematic configuration of an eNB to which the technology of the present disclosure may be applied.

FIG. 18 is a block diagram illustrating first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in a Multiple Input Multiple Output (MIMO) antenna), and is used for the base station apparatus 820 to transmit and receive radio signals. The eNB 800 may include the multiple antennas 810, as illustrated in FIG. 17. For example, the multiple antennas 810 may be compatible with multiple frequency bands used by the eNB 800. Although FIG. 18 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSR and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through, a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme (such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 18. For example, the multiple BB processors 826 may be compatible with multiple frequency bands used by the eNB 800. The radio communication interface 825 may include the multiple RF circuits 827, as illustrated in FIG. 18. For example, the multiple RF circuits 827 may be compatible with multiple antenna, elements. Although FIG. 18 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 18, the transceiving unit 103 described with reference to FIG. 3 can be implemented by the radio communication interface 825. At least a portion of the functionality can also be implemented by controller 821. For example, the controller 821 can perform the configuration of the SL-DRX and the generation of the corresponding control signaling by performing the functions of the determining unit 101 and the generating unit 102.

Second Application Example

Figure 19:
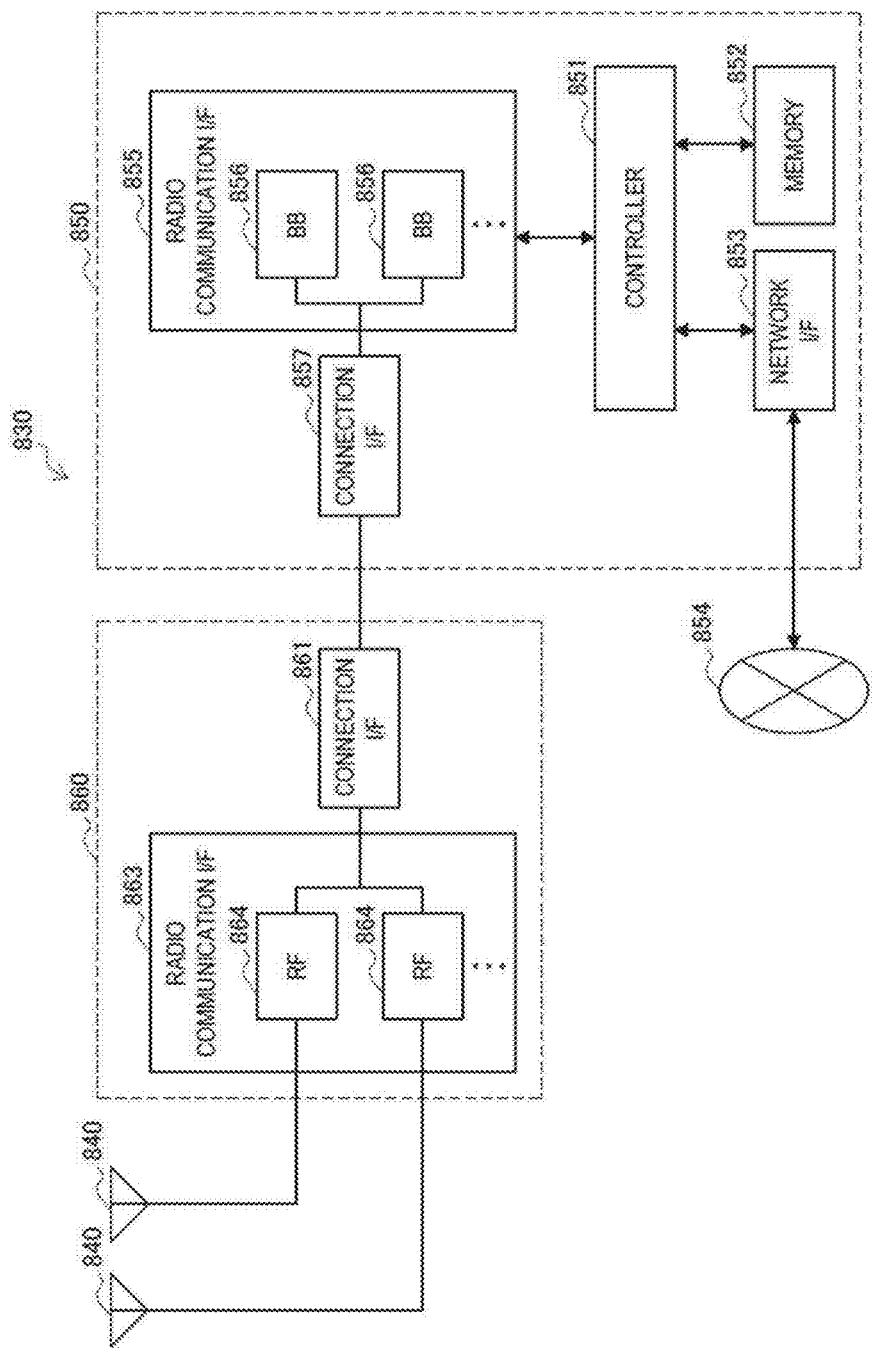
FIG. 19 is a block diagram illustrating a second example of a schematic configuration of an eNB to which the technology of the present disclosure may be applied.

FIG. 19 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna, elements (such as multiple antenna elements included in an MIMO antenna), and is used for the RRH 860 to transmit and receive radio signals. The eNB 830 may include the multiple antennas 840, as illustrated in FIG. 19. For example, the multiple antennas 840 may be compatible with multiple frequency bands used by the eNB 830. Although FIG. 19 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 24.

The radio communication interface 855 supports any cellular communication scheme (such as LTE and LTE-Advanced), and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 19, except the BB processor 856 is connected to the RF circuit 864 of the RRH 860 via the connection interface 857. The radio communication interface 855 may include the multiple BB processors 856, as illustrated to FIG. 19. For example, the multiple BB processors 856 may be compatible with multiple frequency bands used by the eNB 830. Although FIG. 19 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 19. For example, the multiple RF circuits 864 may support multiple antenna elements. Although FIG. 19 illustrates the example in which the radio communication interface 863 includes the multiple RF circuits 864, the radio communication interface 863 may also include a single RF circuit 864.

In the eNB 830 illustrated in FIG. 19, the transceiving unit 103 described with reference to FIG. 3 can be implemented by the radio communication interface 855 and/or the radio communication interface 863. At least a portion of the functionality can also be implemented by controller 851. For example, the controller 851 can perform the configuration of the SL-DRX and the generation of the corresponding control signaling by performing the functions of the determining unit 101 and the generating unit 102.

Application Examples Regarding User Equipment

First Application Example

Figure 20:
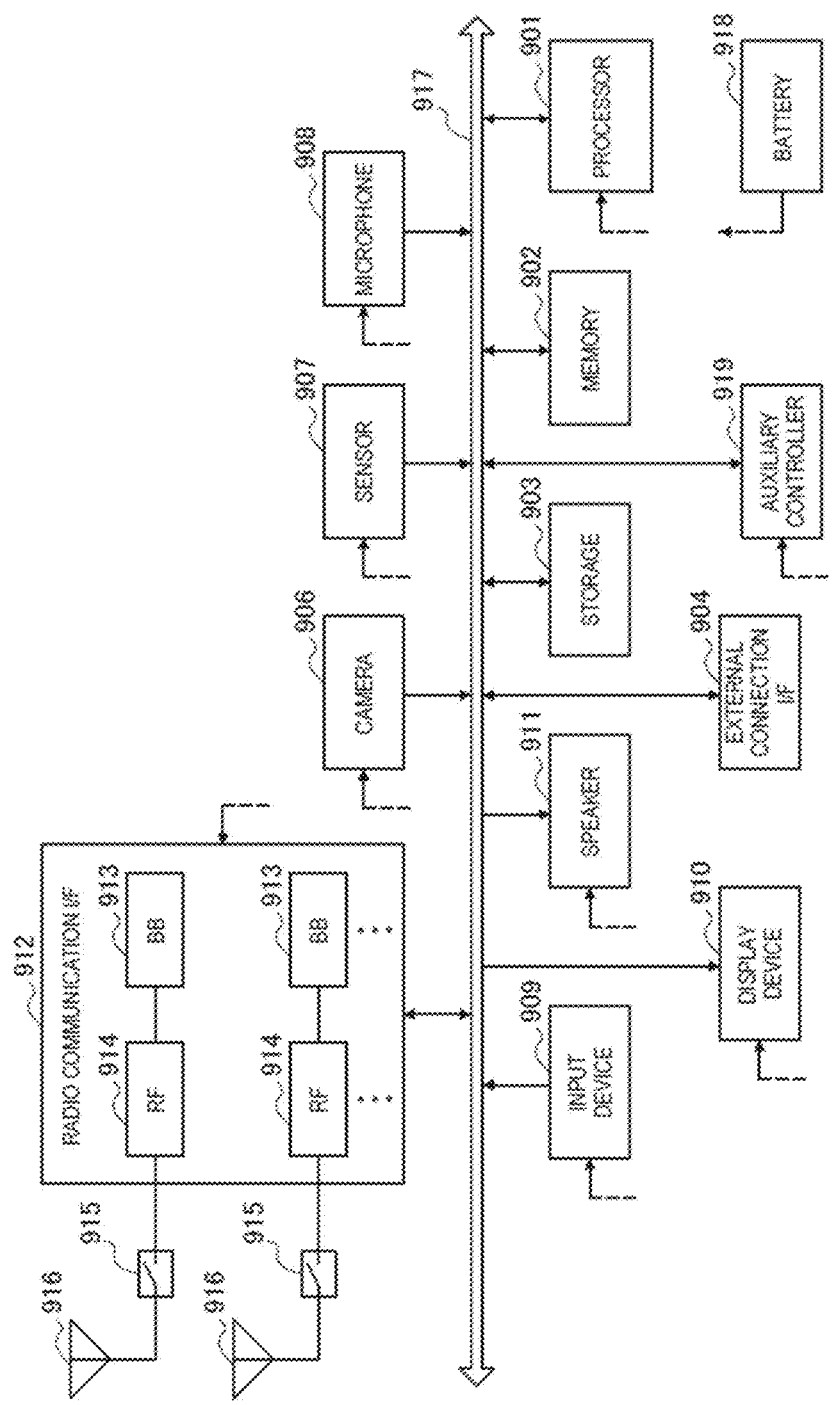
FIG. 20 is a block diagram illustrating an example of a schematic configuration of a smart phone to which the technology of the present disclosure may be applied.

FIG. 20 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device (such as a memory card and a general serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect a touch on a screen of the display device 910, a keypad, a keyboard, a button, or a switch, and receives an operation or an information input from a user. The display device 910 includes a screen (such as a liquid crystal display (LCD) and an organic light-emitting diode (OLED) display), and displays an output image of the smartphone 900. The speaker 911 converts audio signals that are output from the smartphone 900 to sounds.

The radio communication interface 912 supports any cellular communication scheme (such as LET and LTE-Advanced), and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via tire antenna 916. Note that although the figure shows a case where one RF link is connected to one antenna, this is only illustrative, and further includes a case where one RF link is connected to a plurality of antennas through a plurality of phase shifters. The radio communication interface 912 may be a one chip module having the BB processor 913 and the RF circuit 914 integrated thereon. The radio communication interface 912 may include the multiple BB processors 913 and the multiple RF circuits 914, as illustrated in FIG. 20. Although FIG. 20 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 20. Although FIG. 20 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 20 via feeder lines, which are partially shown as dashed lines in the figure. The auxiliary controller 919 operates a minimum necessary function of the smartphone 900, for example, in a sleep mode.

In the smartphone 900 illustrated in FIG. 20, the transceiving unit 203 described with reference to FIG. 6 may be implemented by the radio communication interface 912. At least a part of the functionality may also be implemented by the processor 901 or the auxiliary controller 919. For example, the processor 901 or the auxiliary controller 919 can implement discontinuous reception on the sidelink by performing the functions of the determining unit 201 and the relay transmitting unit 202.

Second Application Example

Figure 21:
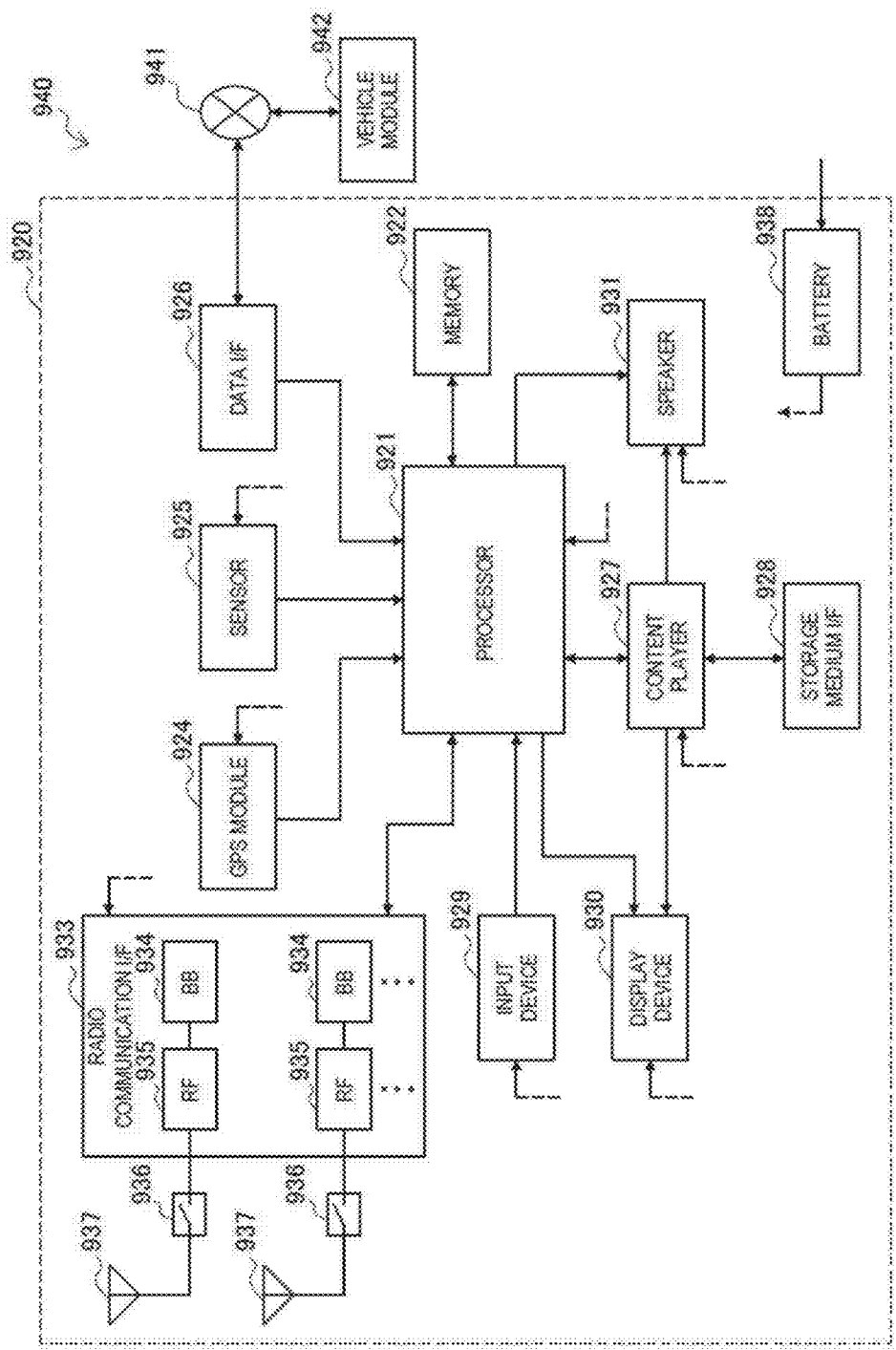
FIG. 21 is a block diagram illustrating an example of a schematic configuration of an car navigation device to which the technology of the present disclosure may be applied.

FIG. 21 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle (such as vehicle speed data).

The content player 927 reproduces content stored in a storage medium (such as a CD and a DVD) that is inserted into the storage medium interface 928. The input device 929 includes, for example, a touch sensor configured to detect a touch on a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme (such as LTE and LTE-Advanced), and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may also be a one chip module that has the BB processor 934 and the RF circuit 935 integrated thereon. The radio communication interface 933 may include the multiple BB processors 934 and the multiple RF circuits 935, as illustrated in FIG. 21. Although FIG. 21 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 21. Although FIG. 20 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 21 via feeder lines that are partially shown as dashed lines in the figure. The battery 938 accumulates power supplied form the vehicle.

In the car navigation apparatus 920 illustrated in FIG. 21, the transceiving unit 203 described with reference to FIG. 6 may be implemented by the radio communication interface 933. At least a part of the functions may also be implemented by the processor 921. For example, the processor 921 can implement discontinuous reception on the sidelink by performing the functions of the determining unit 201 and the relay transmitting unit 202.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data (such as vehicle speed, engine speed, and trouble information), and outputs the generated, data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2200 shown in FIG. 22) from a storage medium or network, wherein the computer is capable of implementing various functions when installed with various programs.

Figure 22:
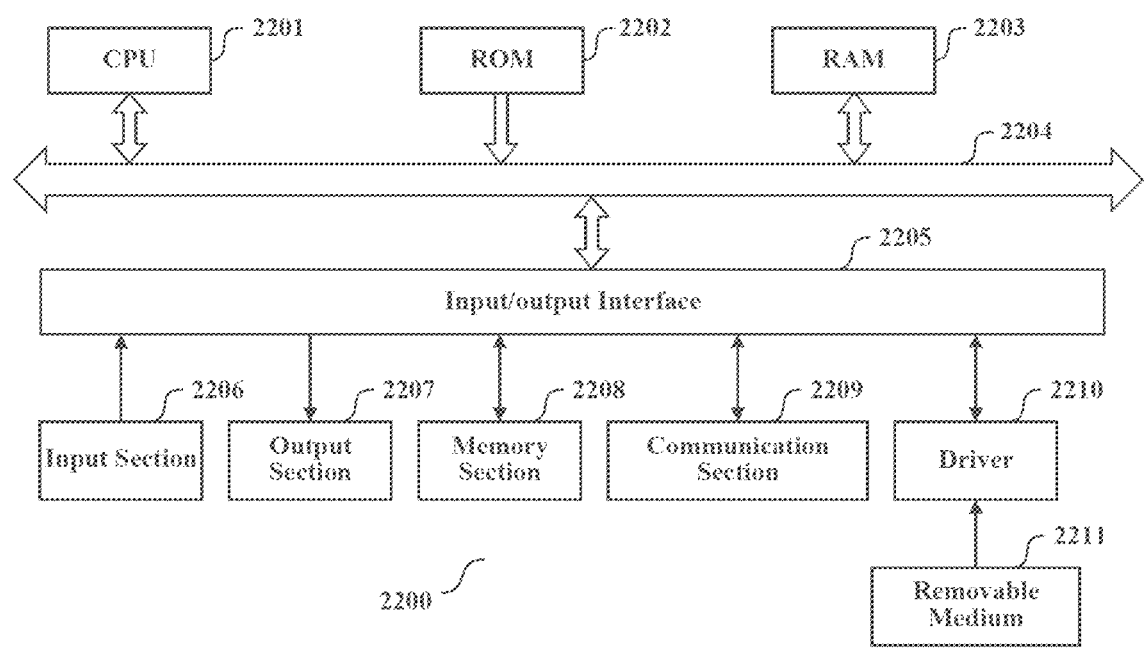
FIG. 22 is a block diagram of an exemplary block diagram illustrating the structure of a general purpose personal computer capable of realizing the method and/or device and/or system according to the embodiments of tire present invention.

In FIG. 22, a central processing unit (CPU) 2201 executes various processing according to a program stored in a read-only memory (ROM) 2202 or a program loaded to a random access memory (RAM) 2203 from a memory section 2208. The data needed for the various processing of the CPU 2201 may be stored in the RAM 2203 as needed. The CPU 2201, the ROM 2202 and the RAM 2203 are linked with each other via a bus 2204. An input/output interface 2205 is also linked to the bus 2204.

The following components are linked to the input/output interface 2205: an input section 2206 (including keyboard, mouse and the like), an output section 2207 (including displays such as a cathode ray tube (CRT), a liquid crystal display (LCD), a loudspeaker and the like), a memory section 2208 (including hard disc and the like), and a communication section 2209 (including a network interface card such as a LAN card, modem and the like). The communication section 2209 performs communication processing via a network such as the Internet. A driver 2210 may also be linked to the input/output interface 2205, if needed. If needed, a removable medium 2211, for example, a magnetic disc, an optical disc, a magnetic optical disc, a semiconductor memory and the like, may be installed in the driver 2210, so that the computer program read therefrom is installed in the memory section 2208 as appropriate.

In the case where the foregoing series of processing is achieved through software, programs forming the software are installed from a network such as the Internet or a memory medium such as the removable medium 2211.

It should be appreciated by those skilled in the art that the memory medium is not limited to the removable medium 2211 shown in FIG. 22, which has program stored therein and is distributed separately from the apparatus so as to provide the programs to users. The removable medium 2211 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2202 and the memory section 2208 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for a network control terminal, comprising:
    processing circuitry, configured to:
    with respect to a sidelink between a relay network node and a remote network node, configure discontinuous reception SL-DRX for the relay network node and/or the remote network node;
    generate a control signaling including configuration of the SL-DRX, to indicate to the relay network node and/or the remote network node transmit the control signaling to the relay network node and/or the remote network node; and
    schedule, based on a SL-DRX sleep indicator from the relay network node, general downlink transmission from the network control terminal to the relay network node, wherein, the SL-DRX sleep indicator represents that the sidelink of the relay network node enters a sleep state, or
    schedule, based on a SL-DRX remote sleep indicator from the relay network node, general downlink transmission from the network control terminal to the remote network node, wherein, the SL-DRX remote sleep indicator represents that the sidelink of the remote network node enters a sleep state.

2. The electronic apparatus according to claim 1, wherein, the processing circuitry is configured to configure the discontinuous reception SL-DRX by determining an active time for the relay network node and/or the remote network node to detect PSCCH and a sleep time for the relay network node and/or the remote network node not to detect the PSCCH.

3. The electronic apparatus according to claim 2, wherein, the configuration of the SL-DRX comprises: a SLDRX-onDurationTimer for indicating the number of continuous PSCCH sub-frames for a network node to detect the PSCCH after the network node wakes up from a sleep state; a SLDRX-InactivityTimer for indicating the maximum number of PSCCH sub-frames for the network node to wait for successful decoding of the PSCCH; a SLDRX-Cycle for indicating the number of subframes included in one SL-DRX cycle; and a SLDRX-StartOffset for indicating a sub-frame position where each SL-DRX cycle starts.

4. The electronic apparatus according to claim 1, further comprising:
   transceiver configured to transmit the control signaling to the relay network node and/or the remote network node.

5. The electronic apparatus according to claim 4, wherein, the transceiver is configured to transmit the control signaling including the configuration of the SL-DRX of the relay network node and the remote network node to the relay network node, wherein, the configuration of the SL-DRX of the remote network node is forwarded by the relay network node.

6. The electronic apparatus according to claim 1, wherein, the processing circuitry is further configured to allocate resources orthogonal to each other to general downlink transmission from the network control terminal to the relay network node and sidelink transmission from the remote network node to the relay network node; or allocate resources orthogonal to each other to general downlink transmission from the network control terminal to the remote network node and sidelink transmission from the relay network node to the remote network node.

7. The electronic apparatus according to claim 6, wherein, the processing circuitry is further configured to set, based on priority levels of the general link and the sidelink, a transmission order of the general link and the sidelink, and update the configuration of the SL-DRX of the relay network node or the remote network node based on the transmission order.

8. The electronic apparatus according to claim 1, wherein, in a case that discontinuous reception (DRX) is used between the network control terminal and a network node, the processing circuitry is configured to allocate receiving resources orthogonal to each other to the DRX and the SL-DRX.

9. The electronic apparatus according to claim 8, wherein, the processing circuitry is configured to allocate receiving time windows independent from each other in time domain to the DRX and the SL-DRX.

10. The electronic apparatus according to claim 1, wherein, in a case that discontinuous reception DRX is used between the network control terminal and a network node, the processing circuitry is further configured to adjust, based on an adjusting indication from the network node, the configuration of the DRX or SL-DRX of the network node.

11. The electronic apparatus according to claim 1, wherein, in a case that discontinuous reception DRX is used between the network control terminal and the remote network node, the processing circuitry is further configured to generate, after the network control terminal finishes data transmission to the remote network node, a UuDRX remote sleep indicator to indicate to the relay network node that the DRX of the remote network node enters a sleep time.

12. The electronic apparatus according to claim 11, wherein, the processing circuitry is further configured to update the configuration of the SL-DRX of the remote network node.

13. An electronic apparatus for a network node, comprising:
   processing circuitry, configured to:
   with respect to a sidelink between the network node and one or more other network nodes, configure discontinuous reception SL-DRX for the network node and/or the one or more other network nodes;
   perform, based on configuration of the SL-DRX, relay transmission between the network node and the one or more other network nodes; and
   schedule, based on a SL-DRX sleep indicator from the relay network node, general downlink transmission from the network control terminal to the relay network node, wherein, the SL-DRX sleep indicator represents that the sidelink of the relay network node enters a sleep state, or
   schedule, based on a SL-DRX remote sleep indicator from the relay network node, general downlink transmission from the network control terminal to the remote network node, wherein, the SL-DRX remote sleep indicator represents that the sidelink of the remote network node enters a sleep state.

14. The electronic apparatus according to claim 13, wherein, the processing circuitry is configured to configure the discontinuous reception SL-DRX by determining an active time for the network node and/or the one or more other network nodes to detect PSCCH and a sleep time for the network node and/or the one or more other network not to detect the PSCCH.

15. The electronic apparatus according to claim 13, further comprising:
   a transceiver configured to transmit a control signaling including configuration of the SL-DRX of another network node to the corresponding network node.

16. The electronic apparatus according to claim 15, wherein, the transceiver is further configured to transmit control information instructing the other network node to enter a SL-DRX sleep state to the other network node, or receive the control information from the other network node.

17. The electronic apparatus according to claim 13, wherein, the processing circuitry is configured to determine, based on a control signaling from a network control terminal, the configuration of the SL-DRX.

18. The electronic apparatus according to claim 13, wherein, in a case that discontinuous reception DRX is used between a network control terminal and the network node, the processing circuitry is further configured to generate, in a case that a receiving time window of the DRX and that of the SL-DRX overlap, an adjusting indication for adjusting the configuration of the DRX or the SL-DRX, to instruct the network control terminal or the other network node to adjust the configuration of the DRX or the SL-DRX.

\* \* \* \* \*